United States Patent
Chell et al.

(10) Patent No.: US 7,148,777 B2
(45) Date of Patent: Dec. 12, 2006

(54) PERMANENT MAGNET ASSEMBLY

(75) Inventors: Jeremy Chell, Madison, WI (US); Carl B. Zimm, Madison, WI (US)

(73) Assignee: Astronautics Corporation of America, Milwaukee, WI (US)

( * ) Notice: Subject to any disclaimer, the term of this patent is extended or adjusted under 35 U.S.C. 154(b) by 29 days.

(21) Appl. No.: 11/050,109

(22) Filed: Feb. 3, 2005

(65) Prior Publication Data

US 2005/0242912 A1    Nov. 3, 2005

Related U.S. Application Data

(60) Provisional application No. 60/541,484, filed on Feb. 3, 2004.

(51) Int. Cl.
    *H01F 7/02* (2006.01)
(52) U.S. Cl. ...................... 335/306; 335/302
(58) Field of Classification Search ......... 335/302–306
    See application file for complete search history.

(56) References Cited

U.S. PATENT DOCUMENTS

| | | | |
|---|---|---|---|
| 4,033,734 A | 7/1977 | Steyert, Jr. et al. |
| 4,069,028 A | 1/1978 | Brown |
| 4,107,935 A | 8/1978 | Steyert, Jr. |
| 4,112,699 A | 9/1978 | Hudson, III et al. |
| 4,203,740 A | 5/1980 | Vaseen |
| 4,332,135 A | 6/1982 | Barclay et al. |
| 4,392,356 A | 7/1983 | Brown |
| 4,408,463 A | 10/1983 | Barclay |
| 4,441,325 A | 4/1984 | Bon-Mardion et al. |
| 4,453,114 A | 6/1984 | Nordlund |
| 4,459,811 A | 7/1984 | Barclay et al. |
| 4,483,341 A | 11/1984 | Witteles |
| 4,507,927 A | 4/1985 | Barclay |
| 4,507,928 A | 4/1985 | Johnson |
| 4,514,987 A | 5/1985 | Pundak et al. |
| 4,532,770 A | 8/1985 | Hakuraku et al. |
| 4,625,519 A | 12/1986 | Hakuraku et al. |
| 4,702,090 A | 10/1987 | Barclay et al. |
| 4,704,871 A | 11/1987 | Barclay et al. |
| 4,727,721 A | 3/1988 | Peschka et al. |
| 4,727,722 A | 3/1988 | Kirol |
| 4,785,636 A | 11/1988 | Hakuraku et al. |
| 4,901,047 A | 2/1990 | Wipf |
| 4,916,907 A | 4/1990 | Munk et al. |
| 5,012,060 A | 4/1991 | Gerard et al. |
| 5,024,059 A | 6/1991 | Noble |
| 5,091,361 A | 2/1992 | Hed |
| 5,156,003 A | 10/1992 | Yoshiro et al. |
| 5,162,771 A | 11/1992 | Abele |

(Continued)

FOREIGN PATENT DOCUMENTS

FR    2 574 913    6/1986

(Continued)

OTHER PUBLICATIONS

Supplementary European Search Report issued Feb. 25, 2005 on EP 02795829.

(Continued)

*Primary Examiner*—Lincoln Donovan
(74) *Attorney, Agent, or Firm*—Foley & Lardner LLP

(57) ABSTRACT

A permanent magnet assembly is disclosed that is adapted to provide a magnetic field across an arc-shaped gap. Such a permanent magnet assembly can be used, for example, to provide a time-varying magnetic field to an annular region for use in a magnetic refrigerator.

25 Claims, 8 Drawing Sheets

U.S. PATENT DOCUMENTS

| | | | |
|---|---|---|---|
| 5,165,242 A | 11/1992 | Chang | |
| 5,177,970 A | 1/1993 | Chang | |
| 5,182,914 A | 2/1993 | Barclay et al. | |
| 5,209,068 A | 5/1993 | Saji et al. | |
| 5,249,424 A | 10/1993 | DeGregoria et al. | |
| 5,329,267 A | 7/1994 | Endoh et al. | |
| 5,332,029 A | 7/1994 | Tokai et al. | |
| 5,381,664 A | 1/1995 | Bennett et al. | |
| 5,428,335 A | 6/1995 | Leupold et al. | |
| 5,444,983 A | 8/1995 | Howard | |
| 5,447,034 A | 9/1995 | Kuriyama et al. | |
| 5,495,222 A | 2/1996 | Abele et al. | |
| 5,596,304 A * | 1/1997 | Tatchyn | 335/306 |
| 5,635,889 A | 6/1997 | Stelter | |
| 5,641,424 A | 6/1997 | Ziolo et al. | |
| 5,743,095 A | 4/1998 | Gschneidner, Jr. et al. | |
| 5,790,006 A | 8/1998 | Abele et al. | |
| 5,864,275 A | 1/1999 | Ohashi et al. | |
| 5,886,609 A * | 3/1999 | Stelter | 335/306 |
| 5,887,449 A | 3/1999 | Pecharsky et al. | |
| 5,934,078 A | 8/1999 | Lawton, Jr. et al. | |
| 5,942,962 A | 8/1999 | Gery | |
| 5,963,117 A | 10/1999 | Ohashi et al. | |
| 6,044,899 A | 4/2000 | Langley et al. | |
| 6,079,213 A | 6/2000 | Driehuys et al. | |
| 6,084,498 A | 7/2000 | Stelter et al. | |
| 6,109,343 A | 8/2000 | Langley et al. | |
| 6,250,087 B1 | 6/2001 | Owada et al. | |
| 6,269,648 B1 | 8/2001 | Hasson et al. | |
| 6,293,111 B1 | 9/2001 | Nacher et al. | |
| 6,305,190 B1 | 10/2001 | Driehuys et al. | |
| 6,446,441 B1 | 9/2002 | Dean | |
| 6,467,274 B1 | 10/2002 | Barclay et al. | |
| 6,526,759 B1 | 3/2003 | Zimm et al. | |
| 6,668,560 B1 | 12/2003 | Zimm et al. | |
| 6,680,663 B1 * | 1/2004 | Lee et al. | 335/306 |
| 6,946,941 B1 * | 9/2005 | Chell | 335/306 |
| 2002/0053209 A1 | 5/2002 | Zimm et al. | |

FOREIGN PATENT DOCUMENTS

| | | |
|---|---|---|
| JP | 62 106271 | 5/1987 |
| RU | 2 040 704 | 7/1995 |

OTHER PUBLICATIONS

Supplementary Partial European Search Report issued Jan. 4, 2005 on EP 02795829.

C.R. Cross, et al., "Optimal Temperature-Entropy Curves for Magnetic Refrigeration," Advances in Cryogenic Engineering, vol. 33, pp. 767-776, 1988, and Cryogenic Engineering Conference, Jun. 1987.

L.D. Kirol, et al., "Rotary Recuperative Magnetic Heat Pump," in Advances in Cryogenic Engineering, 1988, (no month).

A.J. DeGregoria, et al., "Test Results of an Active Magnetic Regenerative Refrigerator," Advances in Cryogenic Engineering, vol. 37B, 1991, and Cryogenic Engineering Conf., 1991, Jun. 11-14, 1991, Huntsville, Alabama.

A.J. DeGregoria, et al., "Modeling the Active Magnetic Regenerator," Advances in Cryogenic Engineering, vol. 37B, 1991, and Cryogenic Engineering Conf., 1991, Jun. 11-14, 1991, Huntsville, Alabama.

"The Big Chill . . . Magnetic Refrigeration Technology Makes a Cool Debut," the "Insider," Ames Laboratory, Department of Energy, Ames, Iowa, Feb. 1997.

"New Fridge Technology on the Horizon," The Capital Times, Feb. 21, 1997.

K.A. Gschneidner, Jr., "Magnetic Refrigeration," in Rare Earths: Science, Technology and Applications III, The Minerals, Metals and Materials Society, 1997, pp. 209-221, (no month).

S. J. Lee et al., "Permanent Magnet Array for the Magnetic Refrigerator", Journal of Applied Physics, vol. 91, No. 10, May 15, 2002.

S. J. Lee et al., "Modeling and simulation of a permanent magnet array in elliptical configurations", Proceedings of the 2000 International Conference on Modeling and Simulation of Microsystems, (no date).

* cited by examiner

PERMANENT MAGNET ASSEMBLY

CROSS-REFERENCE TO RELATED APPLICATION

This application claims the benefit of provisional application No. 60/541,484 that was filed Feb. 3, 2004, the disclosure of which is incorporated by reference.

REFERENCE TO GOVERNMENT RIGHTS

This invention was made with Government support under Cooperative Agreement #DE-FC26-03NT41948 awarded by the United States Department of Energy. The Government has certain rights in the invention.

FIELD OF THE INVENTION

This invention relates generally to magnets, and more particularly to permanent magnet assemblies adapted to provide a time-varying magnetic field to an annular region.

BACKGROUND OF THE INVENTION

Permanent magnets have been used for many years and for many purposes. However, new applications of permanent magnets are driving the development of increasingly sophisticated permanent magnet assemblies. A permanent magnet assembly that can produce a high amplitude magnetic field intensity across a gap is of particular interest, especially in applications of magnetocaloric materials. Magnetocaloric materials near a transition from a ferromagnetic state to a paramagnetic state will warm when magnetized and cool when demagnetized. An apparatus that applies a time-varying magnetic field to magnetocaloric materials can be used to provide heating or cooling, for example in a magnetic refrigerator.

A magnet assembly that produces a magnetic field intensity across a gap can be used to apply a time-varying magnetic field to magnetocaloric materials by moving the magnetocaloric materials in and out of the gap. This can be accomplished, for example, by moving the magnetocaloric materials relative to a stationary magnetic assembly, or by moving a magnet assembly relative to stationary magnetocaloric materials.

Movement of magnetocaloric material relative to a magnet assembly can be accomplished through rotational or translational motion. One approach (the "rotating magnet" approach) is to arrange magnetocaloric material in a stationary annular (ring-shaped) structure, and then to rotate a permanent magnet assembly around the ring. Another approach (the "rotating bed" approach) is to arrange magnetocaloric material in an annular structure partially surrounded by a stationary permanent magnet assembly, and then to rotate the annular structure containing the magnetocaloric material. Thus, a permanent magnet assembly specially adapted to provide a time-varying magnetic field to an annular region is of interest, for applications including, but not limited to, magnetic refrigeration.

SUMMARY OF THE INVENTION

A permanent magnet assembly according to the present invention is adapted to generate a strong magnetic field across an air gap and to provide a time-varying magnetic field to an annular region having a central axis while minimizing the volume, mass, and fabrication cost of such an assembly. A permanent magnet assembly according to the invention can be especially well suited for a rotating bed or rotating magnet magnetic refrigerator.

For example, a permanent magnet assembly according to the invention can allow constant access to the air gap or annular region from one side. This can enable components of a magnetic refrigerator, such as beds containing magnetocaloric material and heat transfer fluid plumbing, to be stationary and positioned within the air gap or annular region while the magnet assembly rotates. Alternatively, the magnet assembly can be made stationary, while components of a magnetic refrigerator, such as beds containing magnetocaloric material and heat transfer fluid plumbing, rotate within the annular region.

A permanent magnet assembly according to the invention includes a plurality of magnet blocks made of sintered magnet material, each magnet block having its own magnetic field vector. The magnet blocks are positioned to direct the path of flux lines within the assembly along a loop that spans the incorporated air gap.

To reduce fabrication costs, a permanent magnet assembly according to the invention can use magnet blocks in as close to their assintered form as possible, to minimize the number of cutting and grinding operations and reduce the amount of scrap material, by reducing the need for precisely machined permanent magnets. Some or all of the permanent magnet portions of such a magnet assembly can be arc-shaped with a rectangular cross section or generally rectangular in shape, in either case with an orthogonal magnetization vector to minimize production costs. This geometry can be especially well suited to the manufacture of sintered NdFeB magnets by current pressing methods, and the relatively low number of magnet mating surfaces can reduce the number of precision grinding operations that might otherwise be required.

A permanent magnet assembly according to the invention can include one or more features to optimize the assembly for a particular application. A permanent magnet assembly according to the invention can include one or more pole pieces, for example to focus and concentrate magnetic flux into the air gap. A permanent magnet assembly according to the invention can include one or more blocking magnets, for example to concentrate flux or minimize stray flux. A permanent magnet assembly according to the invention may include a flux containment jacket or one or more flux containment sheaths, for example to minimize flux loss outside the flux loop.

Precisely machined structures used in a magnet assembly according to the invention, for example pole pieces that surround a gap at high magnetic field, may have surfaces that benefit from close tolerances to allow these surfaces to nest closely together with other components of a magnetic refrigerator, such as containers of magnetocaloric materials. By forming any structures requiring precise machining, such as pole pieces, of magnetically permeable material, and operatively coupling those precisely machined structures to rectangular permanent magnet portions, any precision machining of permanent magnet material can be reduced or avoided.

A permanent magnet assembly according to the invention can provide axial gap flux (magnetic flux through the air gap in a direction parallel to the central axis of an annular region). In such a permanent magnet assembly providing axial gap flux, either an interior flux return path (located inside the annular region) or an exterior flux path (located outside the annular region) can be used.

Alternatively, such a permanent magnet assembly can provide radial gap flux (magnetic flux through the air gap in a direction normal to the central axis of an annular region). In such a permanent magnet assembly providing radial gap flux, either an upper flux return path (located above the annular region) or a lower flux path (located below the annular region) can be used.

A preferred embodiment of a permanent magnet assembly according to the present invention provides axial gap flux with an exterior flux return path, and includes straight-segment configuration features. This preferred embodiment includes two upper radial permanent magnets, two lower radial permanent magnets, two central axial permanent magnets, with two upper axial permanent magnets and two lower axial permanent magnets surrounding an air gap, arranged to form a magnetic loop to subject the air gap to a high axial magnetic field. The preferred embodiment may include upper and lower circumferential blocking magnets and upper and lower radial blocking magnets that can improve the field generation characteristics without greatly increasing the cost, although this is not required.

An alternative permanent magnet assembly according to the invention provides axial gap flux with an exterior flux return path, and includes arc-shaped curved block magnets having a rectangular cross-section. This alternative permanent magnet assembly includes an arc-shaped central axial permanent magnet, arc-shaped upper and lower radial permanent magnets, and arc-shaped upper and lower axial permanent magnets surrounding an arc-shaped air gap, arranged to form a magnetic loop to subject the air gap to a high axial magnetic field.

A different permanent magnet assembly according to the invention has two air gaps at high magnetic field with axial gap flux, an interior flux return path, and primarily straight configuration features. This permanent magnet assembly includes a central axial permanent magnet, first and second upper radial permanent magnets, first and second lower radial permanent magnets, a first upper axial permanent magnet and a first lower axial permanent magnet surrounding a first air gap, and a second upper axial permanent magnet and a second lower axial permanent magnet surrounding a second air gap, arranged to form two magnetic loops to subject the two air gaps to a high axial magnetic field.

Another permanent magnet assembly according to the invention provides radial gap flux with a lower flux return path, and includes arc-shaped curved block magnets having a rectangular cross section. This permanent magnet assembly includes an arc-shaped central radial magnet, interior and exterior arc-shaped axial magnets, and interior and exterior arc-shaped radial magnets surrounding an arc-shaped air gap, arranged to form a magnetic loop to subject the air gap to a high radial magnetic field.

A permanent magnet assembly according to the invention can be of particular interest for use in a magnetic refrigeration device. Exemplary magnetic refrigeration devices that use rotational motion are shown in U.S. Pat. Nos. 6,526,759 and 6,668,560, the disclosures of which are incorporated by reference.

Further objects, features, and advantages of the invention will be apparent from the following detailed description when taken in conjunction with the accompanying drawings.

DETAILED DESCRIPTION OF THE INVENTION

Figure 1:
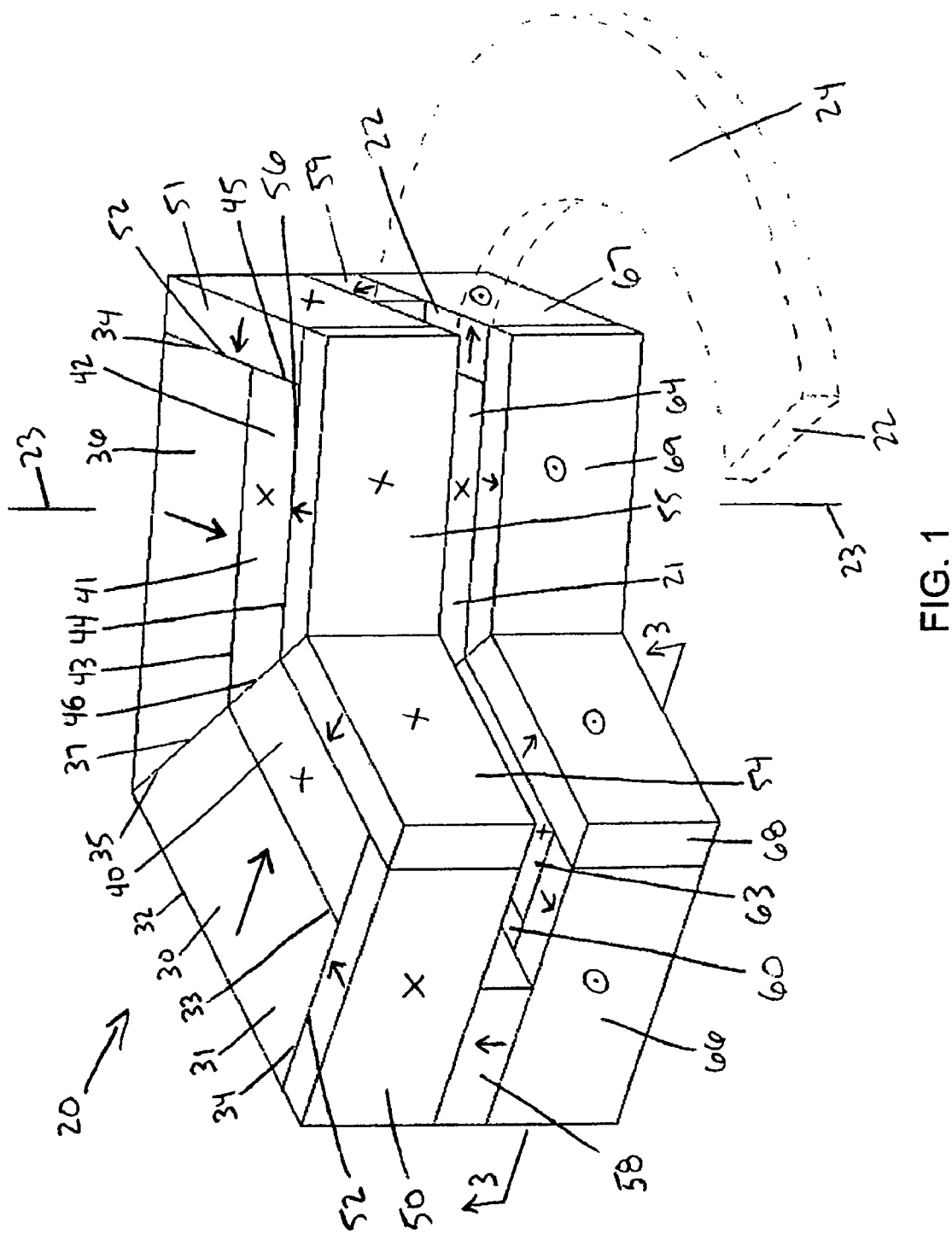
FIG. 1 is a top perspective view of a preferred embodiment of a permanent magnet assembly according to the invention having axial gap flux, an exterior flux return path, and straight-segment configuration features.

Referring to the drawings, FIGS. 1, 2, 4, 6, and 8 provide perspective views of three-dimensional permanent magnet assemblies that include permanent magnet portions. For ease of fabrication, each permanent magnet portion is formed as a polyhedral solid having multiple faces, as an arc-shaped solid having a rectangular or square cross-section, or as a slight variation of those shapes using a minimal number of straight cuts. Each permanent magnet portion is magnetized, with a direction of magnetization (the magnetization vector) that is often either substantially parallel or substantially perpendicular (normal) relative to a particular face of that permanent magnet portion. By way of example, a typical bar magnet having a North end and a South end has a magnetization vector that is substantially parallel to the four faces along the length of the bar magnet, and substantially normal to the two opposing faces at the ends.

To fully describe the structures of the various embodiments of a permanent magnet assembly disclosed here, the drawings should show the directions of the magnetization vectors of the permanent magnet portions. Thus, in the drawings herein, each exposed face of a permanent magnet portion includes a mark that indicates the primary direction of the magnetization vector of that permanent magnet portion relative to that face whenever it is practical to do so.

For example, a face of a permanent magnet portion that lies approximately parallel to the magnetization vector in that permanent magnet portion will be referred to herein as a "flux parallel" face. An arrow on a face of a permanent magnet portion means that face is a flux parallel face, and that the magnetization vector in that permanent magnet portion is pointed in the direction of the arrow. On such a flux parallel face, by convention and not as a limitation, the point of the arrow may be considered the North end of the magnetization vector and the tail of the arrow may be considered the South end of the magnetization vector.

Similarly, an X on a face of a permanent magnet portion means that the magnetization vector in that permanent magnet portion is pointed into that permanent magnet portion. A convenient way to remember this is to think of the X as the feathers on the tail of an arrow going into the face. By convention and not as a limitation, a face of a permanent magnet portion bearing an X may be considered the South end of that permanent magnet portion. If the magnetization vector is approximately normal to that face, the face will be referred to herein as a "flux entry" face. If the magnetization vector is at an acute (less than about 90 degree) angle to that face, the face will be referred to herein as a "partial flux entry" face. The term "at least a partial flux entry face" herein includes both flux entry faces and partial flux entry faces.

Further, an O with a dot in the center on a face of a permanent magnet portion indicates that the magnetic vector is pointed out of that permanent magnet portion. This can be remembered by thinking of the O with a dot in the center as representing the point of an arrow emerging from the face. By convention and not as a limitation, a face of a permanent magnet portion bearing an O with a dot in the center may be considered the North end of that permanent magnet portion. If the magnetization vector is approximately normal to that face, the face will be referred to herein as a "flux exit" face. If the magnetization vector is at an acute (less than about 90 degree) angle to that face, the face will be referred to herein as a "partial flux exit" face. The term "at least a partial flux exit face" herein includes both flux exit faces and partial flux exit faces.

Further, it should be understood that the depicted direction of the magnetization vector of any particular permanent magnet portion is the magnetization vector of that permanent magnet portion in isolation. The direction of magnetic flux will, of course, shift when that permanent magnet portion is coupled with other permanent magnet portions having different magnetization vectors to form a composite permanent magnet assembly.

Finally, the cross-sectional views of FIGS. 3, 5, 7, 9, and 10–14 include cross-sections of permanent magnet portions. In the permanent magnet portions shown in these figures, the magnetization vectors are approximately parallel to the plane of the cross-section, and each cross-section of a permanent magnet portion bears an arrow indicating the direction of the magnetization vector in that portion. By convention and not as a limitation, the point of the arrow may be considered the North end of the magnetization vector and the tail of the arrow may be considered the South end of the magnetization vector.

By way of example, applying the convention described above to a typical bar magnet formed as an elongated rectangular block having a North end and a South end, the four faces along the length of the bar magnet would all be flux parallel faces bearing arrows pointing from the South to the North end, the end face at the North end would be a flux exit face bearing an O with a dot in the center, and the end face at the South end would be a flux entry face bearing an X.

Of course, as long as all the arrows in a drawing are treated the same way, the above-described convention could be reversed whereby the arrow point would indicate the South end, the arrow tail would indicate the North end, an X would indicate a magnetic vector pointing out of a face, and an O with a dot in it would indicate a magnetic vector pointing into a face.

The permanent magnet portions, including blocking magnets, of the various embodiments of a permanent magnet assembly according to the invention disclosed herein can be formed of any suitable permanent magnet material, for example of the type sold by Sumitomo Special Metals of Japan under the trademark Neomax 50, or a combination of suitable materials.

The magnetically permeable portions, such as pole pieces, flux containment jackets, or flux containment sheaths, can be formed of any suitable magnetically permeable material, for example a structural alloy such as low-carbon steel that has the ability to carry flux, or a specifically permeable material intended for use in magnetics such as the material sold by High Temp Metals of California, USA under the trademark Permendur 2V, or a combination of suitable materials.

Turning now to the drawings, FIG. 1 is a top perspective view of a preferred embodiment of a permanent magnet assembly according to the invention, indicated generally at 20. The permanent magnet assembly 20 surrounds an air gap at high magnetic field 21 having a rectangular cross section 22. The permanent magnet assembly 20 is adapted to rotate about an axis of rotation 23, whereby the air gap 21 sweeps an annular region 24 having a rectangular cross section 22. A portion of the annular region 24 is shown in dotted lines in FIG. 1.

The air gap 21 of the permanent magnet assembly 20 corresponds to a straight-segment approximation of a portion of the annular region 24, covering an arc length of approximately 120 degrees. Although the cross-section of the air gap 21 is preferably rectangular, this is not necessary, and other shapes may be used. Similarly, the arc length may be greater than or less than 120 degrees.

The permanent magnet assembly 20 is said to have axial gap flux, since the direction of magnetic flux through the air gap 21 is parallel to the axis of rotation 23. The permanent magnet assembly 20 is also said to have an external flux return path, since the magnetic flux returns through a path outside the radius of the air gap 21 (from the axis of rotation 23) after crossing the air gap 21. The permanent magnet assembly 20 may be said to have straight-segment configuration features, since it is formed of blocks having straight sides only with no curved surfaces.

The permanent magnet assembly 20 is preferably made entirely from rectangular blocks of sintered material with no more than one diagonal cut. With such a construction, any pre-assembly grinding operations are performed on flat surfaces, thereby simplifying the manufacturing process.

The permanent magnet assembly 20 includes a first upper radial magnet portion 30, formed as a six faced polyhedral solid and having a magnetization vector extending substantially in a radial direction (normal to the axis of rotation 23). The upper exposed face 31 of the upper radial magnet portion is preferably trapezoidal in shape. The upper exposed face 31 is bounded by a major parallel edge 32, a minor parallel edge 33, an outside edge 34, and an inside edge 35. The upper radial magnet portion 30 has a second trapezoidal face (hidden in FIG. 1) directly below, opposite, and parallel to the upper exposed face 31, having approximately the same trapezoidal shape as the upper exposed face 31. The upper exposed face 31 and the parallel second trapezoidal face are both flux parallel faces.

The upper radial magnet portion 30 has an inside lateral face (hidden in FIG. 1), approximately rectangular in shape and extending downward from the inside edge 35 of the upper exposed face 31 to the corresponding edge of the parallel second trapezoidal face. Opposite the inside lateral face, the upper radial magnet portion 30 has an outside lateral face (hidden in FIG. 1), approximately rectangular in shape and extending downward from the outside edge 34 of its upper exposed face 31 to the corresponding edge of the parallel second trapezoidal face.

The upper radial magnet portion has an inside radial face (hidden in FIG. 1), approximately rectangular in shape and extending downward from the minor parallel edge 33 of the upper exposed face 31 to the corresponding edge of the parallel second trapezoidal face. Opposite the inside radial face, the upper radial magnet portion 30 has an outside radial face (hidden in FIG. 1), approximately rectangular in shape and extending downward from the major parallel edge 32 of its upper exposed face 31 to the corresponding edge of the parallel second trapezoidal face. As perhaps best shown in FIG. 3, the outside radial face is a flux entry face, and the inside radial face is a flux exit face.

The permanent magnet assembly 20 includes a second upper radial magnet portion 36 having an inside edge 37. The upper exposed face of the second upper radial magnet portion 36 is a trapezoid, and is shaped as a mirror image (along its inside edge 37) of the upper exposed face 31 of the first upper radial magnet portion 30. Like the first upper radial magnet portion, the second upper radial magnet portion 36 has a second trapezoidal face (hidden in FIG. 1) directly below, opposite, and parallel to its upper exposed face.

Like the first upper radial magnet portion 30, the second upper radial magnet portion 36 has an inside lateral face, an outside lateral face, an inside radial face, and an outside radial face, all of which are hidden in FIG. 1 and shaped generally like the corresponding faces of the upper radial magnet portion 30. Like the corresponding faces of the upper radial magnet portion 30, the outside radial face of the second upper radial magnet portion is a flux entry face, and its inside radial face is a flux exit face.

The first upper radial magnet portion 30 is preferably, but not necessarily, formed by cutting off a corner of a permanent magnet shaped as a rectangular block, using a single cut along the line that becomes the inside edge 35 of the first upper radial magnet portion 30. Similarly, the second upper radial magnet portion 36 is preferably, but not necessarily, formed by cutting off a corner of a permanent magnet shaped as a rectangular block, using a single cut along the line that becomes the inside edge 37 of the second upper radial magnet portion 36.

The permanent magnet assembly 20 also includes a first upper axial magnet portion 40 and a second upper axial magnet portion 41, each formed as a six faced polyhedral solid and having a magnetization vector extending substantially parallel to the axis of rotation 23. The upper exposed face 42 of the second upper axial magnet portion 41 is preferably trapezoidal in shape. The upper exposed face 42 is bounded by a major parallel edge 43, a minor parallel edge 44, an outside edge 45, and an inside edge 46. The upper axial magnet portion 41 has a second trapezoidal face (hidden in FIG. 1) directly below, opposite, and parallel to the upper exposed face 42, having approximately the same trapezoidal shape as the upper exposed face 42. The upper exposed face 42 is a flux entry face, and the parallel second trapezoidal face is a flux exit face.

The upper axial magnet portion 41 has an inside lateral face (hidden in FIG. 1), approximately rectangular in shape and extending downward from the inside edge 46 of the upper exposed face 42 to the corresponding edge of the parallel second trapezoidal face. Opposite the inside lateral face, the upper axial magnet portion 41 has an outside lateral face (hidden in FIG. 1), approximately rectangular in shape and extending downward from the outside edge 45 of its upper exposed face 42 to the corresponding edge of the parallel second trapezoidal face.

The upper axial magnet portion 41 has an inside radial face (hidden in FIG. 1), approximately rectangular in shape and extending downward from the minor parallel edge 44 of the upper exposed face 42 to the corresponding edge of the parallel second trapezoidal face. Opposite the inside radial face, the upper axial magnet portion 41 has an outside radial face (hidden in FIG. 1), approximately rectangular in shape and extending downward from the major parallel edge 43 of its upper exposed face 42 to the corresponding edge of the parallel second trapezoidal face.

The first upper axial magnet portion 40 has a trapezoidal upper exposed face shaped as a mirror image of the upper exposed face 42 of the second upper axial magnet portion 41 (along its inside edge 46). Like the second upper axial magnet portion, the first upper axial magnet portion 40 has a second trapezoidal face (hidden in FIG. 1) directly below, opposite, and parallel to its upper exposed face.

Like the second upper axial magnet portion 41, the first upper radial magnet portion 40 has an inside lateral face, an outside lateral face, an inside radial face, and an outside radial face, all of which are hidden in FIG. 1 and shaped generally like the corresponding faces of the second upper axial magnet portion 41. Like the corresponding faces of the second upper axial magnet portion 41, the trapezoidal upper exposed face of the first upper axial magnet portion 40 is a flux entry face, and its parallel second trapezoidal face is a flux exit face.

The second upper axial magnet portion 41 is preferably, but not necessarily, formed by cutting off a corner of a permanent magnet shaped as a rectangular block, using a single cut along the line that becomes the inside edge 46 of the second upper axial magnet portion 41. Similarly, the first upper axial magnet portion 40 is preferably, but not necessarily, formed by cutting off a corner of a permanent magnet shaped as a rectangular block, using a single cut along the line that becomes the inside lateral face of the first upper axial magnet portion 40.

The permanent magnet assembly 20 preferably includes a first upper circumferential blocking magnet portion 50 and a second upper circumferential blocking magnet portion 51, each formed as a six faced rectangular block and having a magnetization vector extending substantially circumferentially (normal to a radius extending from the axis of rotation 23). The exposed outside lateral faces of the first upper circumferential blocking magnet portion 50 and second upper circumferential blocking magnet portion 51 are flux entry faces.

The first upper circumferential blocking magnet portion 50 and the second upper circumferential blocking magnet portion 51 each have an inside lateral face (hidden in FIG.

1), approximately rectangular in shape and extending downward from the inside edges 52 of those upper circumferential blocking magnet portions. The hidden inside lateral faces of the first upper circumferential blocking magnet portion 50 and second upper circumferential blocking magnet portion 51 are flux exit faces.

The first upper circumferential blocking magnet portion 50 and the second upper circumferential blocking magnet portion 51 are preferably, but not necessarily, formed of a permanent magnet shaped as a rectangular block.

The permanent magnet assembly 20 preferably includes a first upper radial blocking magnet portion 54 and a second upper radial blocking magnet portion 55, each formed as a six faced rectangular block and having a magnetization vector extending substantially radially (normal to the axis of rotation 23). The exposed outside radial faces of the first upper radial blocking magnet portion 54 and second upper radial blocking magnet portion 55 are flux entry faces.

The first upper radial blocking magnet portion 54 and the second upper radial blocking magnet portion 55 each have an inside radial face (hidden in FIG. 1), approximately rectangular in shape and extending downward from the inside edges 56 of those upper radial blocking magnet portions. The hidden inside radial faces of the first upper radial blocking magnet portion 54 and second upper radial blocking magnet portion 55 are flux exit faces.

The first upper radial blocking magnet portion 54 and the second upper radial blocking magnet portion 55 are preferably, but not necessarily, formed by cutting off a corner of a permanent magnet shaped as a rectangular block, using a single straight cut to form the faces where the first upper radial blocking magnet portion 54 and the second upper radial blocking magnet portion 55 meet.

The permanent magnet assembly 20 includes a first central axial magnet portion 58 and a second central axial magnet portion 59, each formed as a six faced polyhedral solid with a magnetization vector extending substantially in an axial direction (parallel to the axis of rotation 23). The upper and lower faces (hidden in FIG. 1) of the central axial magnet portions are preferably trapezoidal in shape. The upper trapezoidal faces are flux exit faces and the lower trapezoidal face are flux entry faces.

The first central axial magnet portion 58 has an inside lateral face that meets the inside lateral face of the second central axial magnet portion 59, both inside lateral faces being approximately rectangular in shape. Opposite the inside lateral face, the central axial magnet portions each have an exposed outside lateral face, also approximately rectangular in shape. The central axial magnet portions each have an inside radial face (partially visible in FIG. 1) that is approximately rectangular in shape. Opposite the inside radial face, each of the central axial magnets has an outside radial face (hidden in FIG. 1), also approximately rectangular in shape.

The first central axial magnet portion 58 and second central axial magnet portion 59 are each preferably, but not necessarily, formed by cutting off a corner of a permanent magnet shaped as a rectangular block, using a single cut along the line that becomes the inside lateral face of each central axial magnet portion.

The first central axial magnet portion 58 and second central axial magnet portion 59 provide a return path for the lines of magnetic flux through the air gap 21. The first central axial magnet portion 58 and second central axial magnet portion 59 preferably have the same vertical dimension as the air gap 21 for convenient fabrication and assembly, and are preferably shaped and exteriorly positioned at a sufficient distance from the air gap 21 to prevent shunting of the gap flux into the flux return path.

Figure 2:
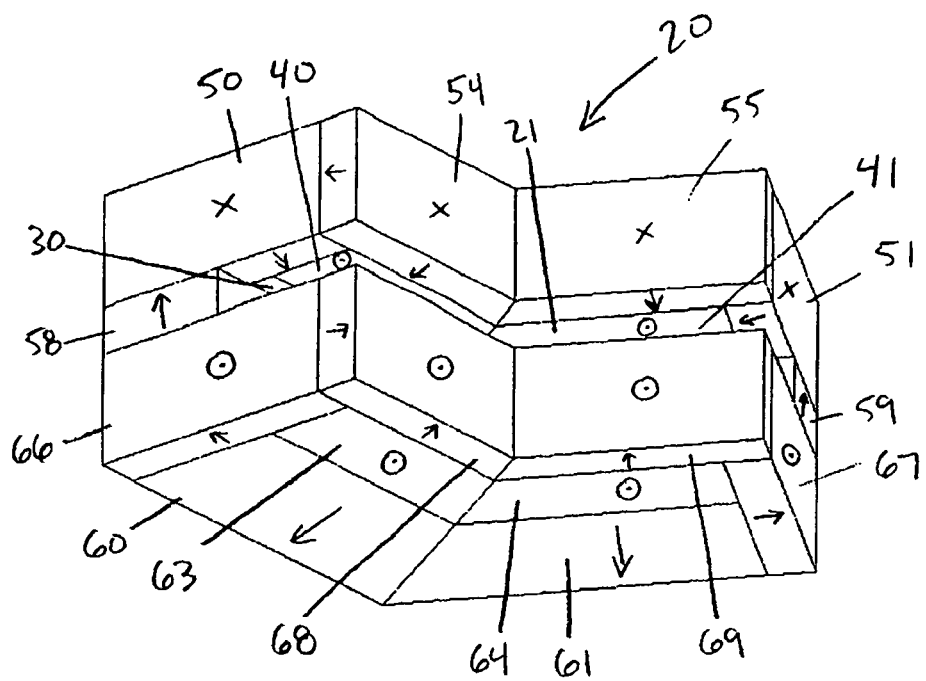
FIG. 2 is a bottom perspective view of the permanent magnet assembly of FIG. 1.

FIG. 2 is a bottom perspective view of the permanent magnet assembly of FIG. 1. As best shown in FIG. 2, the permanent magnet assembly 20 includes a first lower radial magnet portion 60 and a second lower radial magnet portion 61. These lower radial magnet portions are generally shaped like the upper radial magnet portions 30 and 36, and are also preferably formed by cutting off a corner of a rectangular block permanent magnet using a single cut. As perhaps best shown in FIG. 3, the magnetization vectors in the lower radial magnet portions point in a direction opposite to the magnetization vectors in the corresponding upper radial magnet portions.

Similarly, and as best shown in FIG. 2, the permanent magnet assembly 20 includes a first lower axial magnet portion 63 and a second lower axial magnet portion 64. These lower axial magnet portions are generally shaped like the upper axial magnet portions 40 and 41, and are also preferably formed by cutting off a corner of a rectangular block permanent magnet using a single cut. As perhaps best shown in FIG. 3, the magnetization vectors in the lower axial magnet portions point in the same direction as the magnetization vectors in the corresponding upper axial magnet portions.

As best shown in FIG. 2, the permanent magnet assembly 20 also preferably includes a first lower circumferential blocking magnet portion 66 and a second lower circumferential blocking magnet portion 67. These lower circumferential blocking magnet portions are generally shaped like the upper circumferential blocking magnet portions 50 and 51, and are also preferably formed of a single rectangular block permanent magnet. As shown in FIG. 2, the magnetization vectors in the lower circumferential blocking magnet portions point in a direction opposite to the magnetization vectors in the corresponding upper circumferential blocking magnet portions.

As best shown in FIG. 2, the permanent magnet assembly 20 also preferably includes a first lower radial blocking magnet portion 68 and a second lower radial blocking magnet portion 69. These lower radial blocking magnet portions are generally shaped like the upper radial blocking magnet portions 54 and 55, and are also preferably formed of a single rectangular block permanent magnet. As perhaps best shown in FIG. 3, the magnetization vectors in the lower circumferential blocking magnet portions point in a direction opposite to the magnetization vectors in the corresponding upper circumferential blocking magnet portions.

Figure 3:
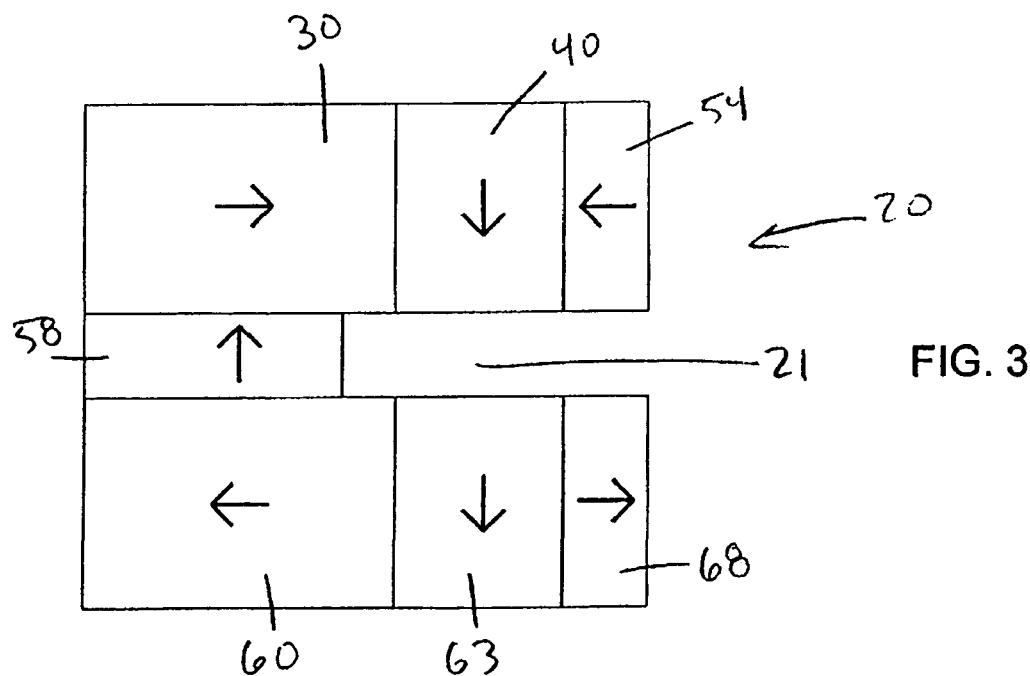
FIG. 3 is a cross-sectional view of the permanent magnet assembly of FIG. 1 taken along the line 3—3 thereof.

FIG. 3 is a cross-sectional view of the permanent magnet assembly 20 of FIG. 1 taken along the line 3—3 thereof. The cross-sectional view of FIG. 3 shows how a magnetic flux loop is formed by the lower axial magnet portion 63, the lower radial magnet portion 60, the central axial magnet portion 58, the upper radial magnet portion 30, the upper axial magnet portion 40, and the air gap at high magnetic field 21.

Although not required, the permanent magnet assembly 20 preferably includes the circumferential blocking magnet portions 50, 51, 66, and 67 and the radial blocking magnet portions 54, 55, 68, and 69 to control the rate of field decay outside of the air gap at high magnetic field 21. Increasing the magnetic flux from these blocking magnet portions, for example by increasing the thickness of the blocking magnet portions or by forming the blocking magnet portions from stronger permanent magnet material, can provide a sharper transition from the high field strength in the air gap at high magnetic field 21 to the low field region outside of the permanent magnet assembly 20.

Figure 4:
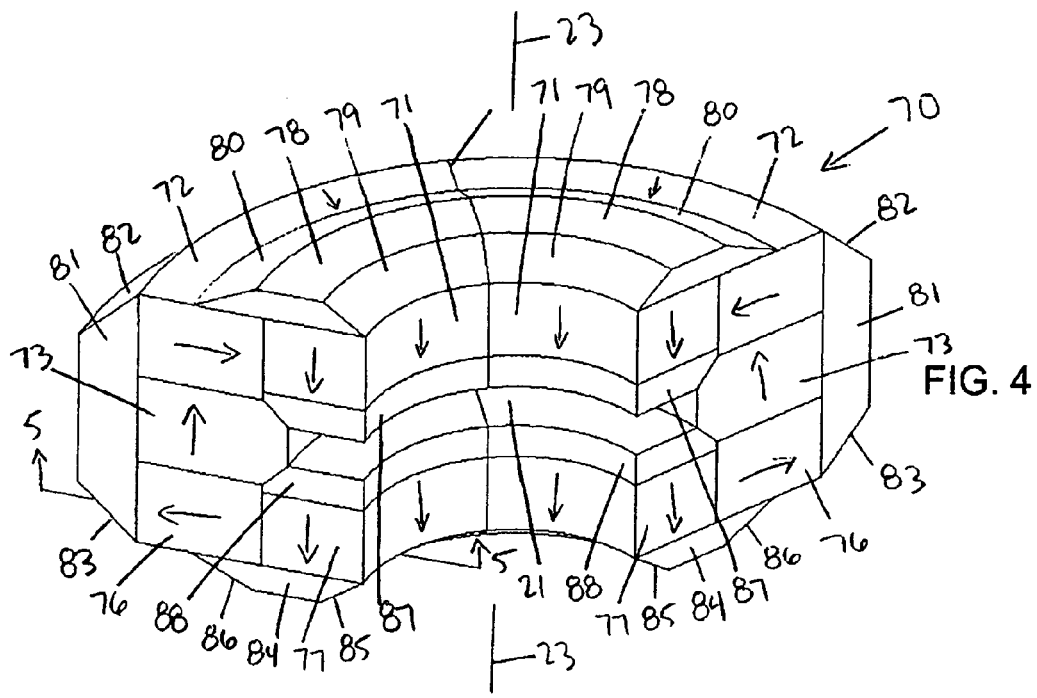
FIG. 4 is a perspective view of an embodiment of a permanent magnet assembly according to the invention having axial gap flux, an exterior flux return path, and curved configuration features.

FIG. 4 is a perspective view of another embodiment of a permanent magnet assembly 70 according to the invention. The permanent magnet assembly 70 surrounds an air gap at high magnetic field 21 having a rectangular cross section. Although the cross-section of the air gap 21 is preferably rectangular, this is not necessary, and other shapes may be used.

Like the permanent magnet assembly 20 of FIGS. 1–3, the permanent magnet assembly 70 of FIG. 4 is adapted to rotate about an axis of rotation 23, whereby the air gap 21 sweeps an annular region having a rectangular cross section (not shown in FIG. 4). The air gap 21 of the permanent magnet assembly 70 covers an arc length of approximately 120 degrees, although this is not required and the arc length may be greater than or less than 120 degrees.

Figure 5:
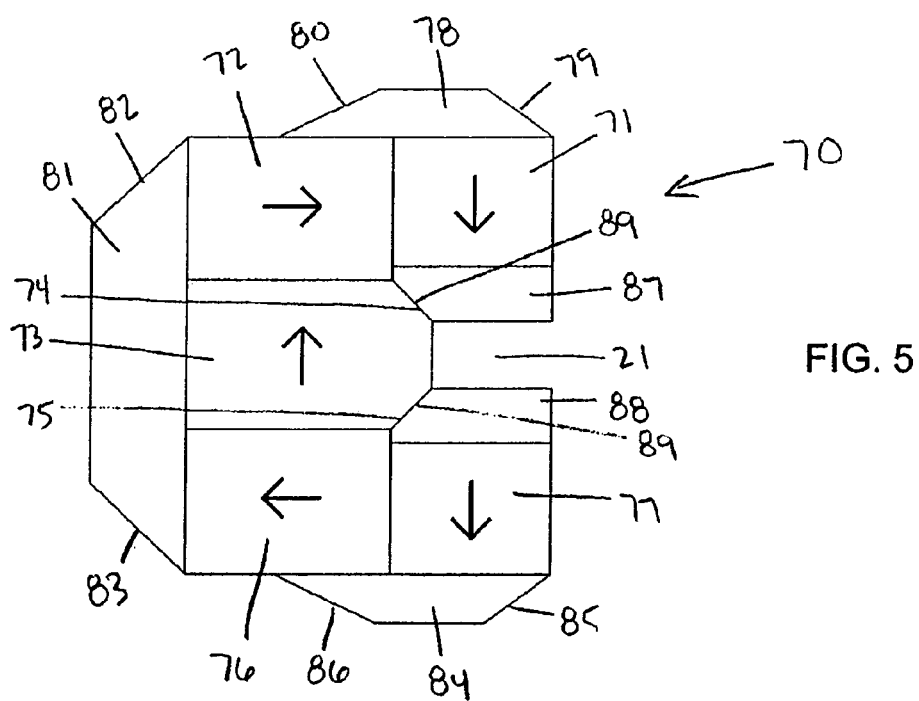
FIG. 5 is a cross-sectional view of the permanent magnet assembly of FIG. 4 taken along the line 5—5 thereof.

As perhaps best seen in FIG. 5, the permanent magnet assembly 70 is said to have axial gap flux, since the direction of magnetic flux through the air gap 21 is substantially parallel to the axis of rotation 23. The permanent magnet assembly 70 is also said to have an external flux return path, since the magnetic flux returns through a path outside the radius of the air gap 21 (from the axis of rotation 23) after crossing the air gap 21. The permanent magnet assembly 20 may be said to have curved configuration features, since it is formed of blocks having curved surfaces.

The permanent magnet assembly 70 includes an upper axial magnet portion 71 formed as an arc-shaped solid having six faces, a rectangular or square cross-section, and a magnetization vector extending substantially parallel to the axis of rotation 23. The upper axial magnet portion 71 can be formed of two pieces, as shown in FIG. 4, or it can be formed of a single piece or a greater number of pieces. The arc-shaped upper face of the upper axial magnet portion 71 is a flux entry face, and the corresponding arc-shaped lower face of the upper axial magnet portion 71 is a flux exit face.

The inside radial face of the upper axial magnet portion 71 is the face nearest to the axis of rotation and normal to a radius extending from the axis of rotation. The outside radial face of the upper axial magnet portion 71 is the face farthest from the axis of rotation and normal to a radius extending from the axis of rotation. The inside and outside radial faces are both flux parallel faces.

The first and second circumferential faces of the upper axial magnet portion 71 are the faces forming the ends of the upper axial magnet portion 71. The first and second circumferential faces of the upper axial magnet portion 71 are both flux parallel faces.

The permanent magnet assembly 70 includes an upper radial magnet portion 72 formed as an arc-shaped solid having six faces, a rectangular or square cross-section, and a magnetization vector extending substantially in a radial direction (normal to the axis of rotation 23). The upper radial magnet portion 72 can be formed of two pieces, as shown in FIG. 4, or it can be formed of a single piece or a greater number of pieces. The arc-shaped upper and lower faces of the upper radial magnet portion 72 are both flux parallel faces.

The inside radial face of the upper radial magnet portion 72 is the face nearest to the axis of rotation and normal to a radius extending from the axis of rotation. The outside radial face of the upper axial magnet portion 72 is the face farthest from the axis of rotation and normal to a radius extending from the axis of rotation. The inside radial face is a flux exit face, and the outside radial face is a flux entry face.

The first and second circumferential faces of the upper radial magnet portion 72 are the faces forming the ends of the upper radial magnet portion 72. The first and second circumferential faces of the upper radial magnet portion 72 are both flux parallel faces.

The permanent magnet assembly 70 includes a central axial magnet portion 73 formed as an arc-shaped solid having six faces, a rectangular or square cross-section, and a magnetization vector extending substantially in an axial direction (parallel to the axis of rotation 23). The central axial magnet portion 73 can be formed of multiple pieces, or it can be formed of a single piece. The arc-shaped upper face of the central axial magnet portion 73 is a flux exit face, and the arc-shaped lower face of the central axial magnet portion 73 is a flux entry face.

The inside radial face of the central axial magnet portion 73 is the face nearest to the axis of rotation and normal to a radius extending from the axis of rotation. The upper and lower corners of the inside radial face of the central axial magnet portion 73 preferably include an upper chamfer 74 and a lower chamfer 75, as best shown in FIG. 5, although this is not required. The outside radial face of the central axial magnet portion 73 is the face farthest from the axis of rotation and normal to a radius extending from the axis of rotation. The inside radial face and the outside radial face of the central axial magnet portion 73 are both flux parallel faces.

The first and second circumferential faces of the central axial magnet portion 73 are the faces forming the ends of the central axial magnet portion 73. As shown in FIG. 4, The first and second circumferential faces of the central axial magnet portion 73 are both flux parallel faces.

The central axial magnet portion 73 provides a return path for the lines of magnetic flux through the air gap 21. The central axial magnet portion 73 is preferably shaped and exteriorly positioned at a sufficient distance from the air gap 21 to prevent shunting of the gap flux into the flux return path.

The permanent magnet assembly 70 includes a lower radial magnet portion 76 shaped like the upper radial magnet portion 72, with a magnetization vector also extending substantially in a radial direction (normal to the axis of rotation 23). The magnetization vector in the lower radial magnet portion 76 points in a direction opposite to the magnetization vector in the corresponding upper radial magnet portion 72.

The permanent magnet assembly 70 includes a lower axial magnet portion 77 shaped like the upper axial magnet portion 71, with a magnetization vector also extending substantially in an axial direction (parallel to the axis of rotation 23). The magnetization vector in the lower axial magnet portion 77 points in the same direction as the magnetization vector in the corresponding upper axial magnet portion 71.

The permanent magnet assembly 70 preferably includes an upper sheath 78 formed of magnetically permeable material. The upper sheath 78 preferably has a trapezoidal cross-section, with a inner chamfer 79, an outer chamfer 80, and upper and lower faces, although this is not required and other shapes may be used. The lower face of the upper sheath 78 preferably covers the junction between the upper axial magnet portion 71 and the upper radial magnet portion 72, and at least a portion of the upper faces of the upper axial magnet portion 71 and the upper radial magnet portion 72.

The permanent magnet assembly 70 preferably includes an exterior sheath 81 formed of magnetically permeable material. The exterior sheath 81 preferably has a trapezoidal cross-section, with an upper chamfer 82, a lower chamfer 83, and inner and outer faces, although this is not required and other shapes may be used. The inner face of the exterior sheath 81 preferably covers at least a portion of the outside radial faces of each of the upper radial magnet portion 72, the central axial magnet portion 73, and the lower radial magnet portion 76, and the junctions therebetween.

The permanent magnet assembly 70 preferably includes an lower sheath 84 formed of magnetically permeable material. The lower sheath 84 preferably has a trapezoidal cross-section, with an inner chamfer 85, an outer chamfer 86, and upper and lower faces, although this is not required and other shapes may be used. The upper face of the lower sheath 84 preferably covers the junction between the lower axial magnet portion 77 and the lower radial magnet portion 76, and at least a portion of the lower faces of the lower axial magnet portion 77 and the lower radial magnet portion 76.

The permanent magnet assembly 70 preferably includes an upper pole piece 87 and a lower pole piece 88 surrounding the air gap at high magnetic field 21. The upper pole piece 87 and lower pole piece 88 are each formed as an arc-shaped solid, and preferably include at least one chamfer 89. The upper face of the upper pole piece 87 is preferably coupled to the lower face of the upper axial magnet portion 71, and the chamfer 89 of the upper pole piece 87 is preferably coupled to the upper chamfer 74 of the central axial magnet portion 73. Similarly, the lower face of the lower pole piece 88 is preferably coupled to the upper face of the lower axial magnet portion 77, and the chamfer 89 of the lower pole piece 88 is preferably coupled to the lower chamfer 75 of the central axial magnet portion 73.

FIG. 5 is a cross-sectional view of the permanent magnet assembly 70 of FIG. 4 taken along the line 5—5 thereof. The cross-sectional view of FIG. 5 shows how a magnetic flux loop is formed by the lower axial magnet portion 77, the lower radial magnet portion 76, the central axial magnet portion 73, the upper radial magnet portion 72, the upper axial magnet portion 71, and the air gap at high magnetic field 21.

Although not required, the permanent magnet assembly 70 preferably includes an upper pole piece 87 and a lower pole piece 88 surrounding the air gap at high magnetic field 21 to guide and concentrate the magnetic flux through the air gap at high magnetic field 21.

Figure 6:
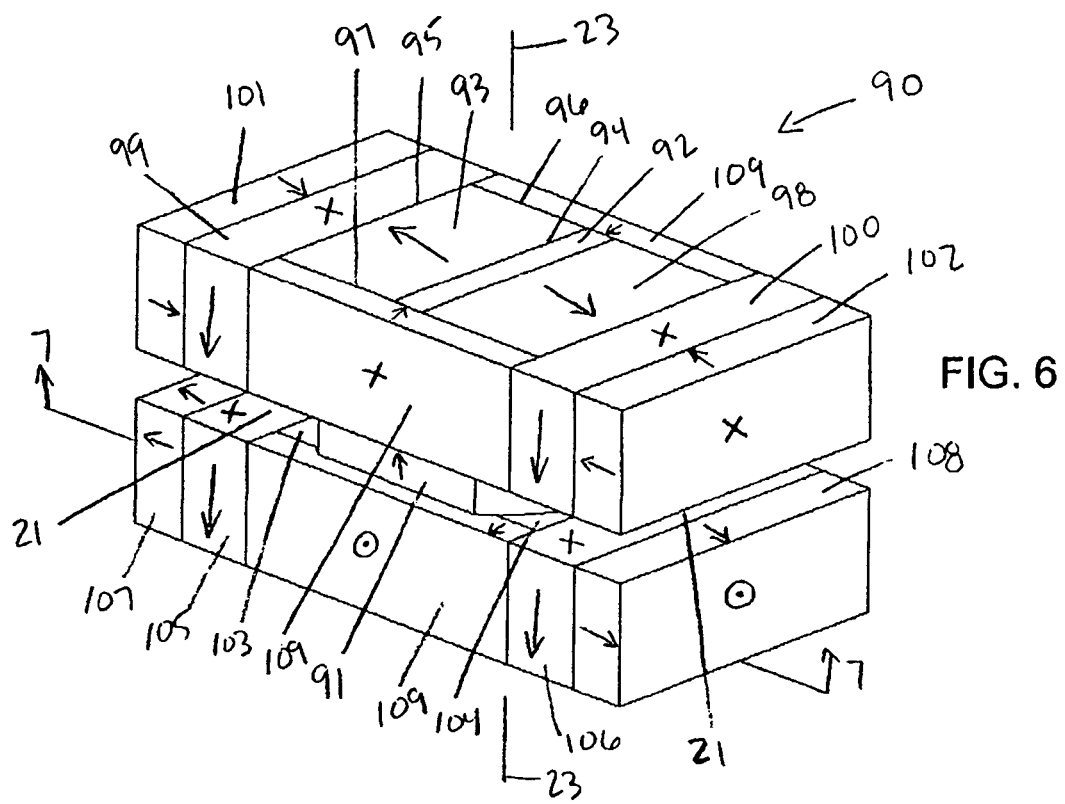
FIG. 6 is a perspective view of an embodiment of a permanent magnet assembly according to the invention having two air gaps at high magnetic field with axial gap flux, an interior flux return path, and primarily straight configuration features.

FIG. 6 is a perspective view of another embodiment of a permanent magnet assembly 90 according to the invention. The permanent magnet assembly 90 has two ends, each end surrounding an air gap at high magnetic field 21 having a rectangular cross section, where both air gaps experience the same direction of magnetic flux. Although the cross-sections of the air gaps 21 are preferably rectangular, this is not necessary, and other shapes may be used. The geometry of the pieces in this permanent magnet assembly 90 allows the majority of any grinding operations needed during the manufacturing stage to be performed on flat surfaces.

Like the permanent magnet assemblies 20 and 70 of FIGS. 1-5, the permanent magnet assembly 90 of FIG. 6 is adapted to rotate about an axis of rotation 23, whereby the air gaps 21 sweep an annular region having a rectangular cross section (not shown in FIG. 6). The air gaps 21 of the permanent magnet assembly 70 each cover an arc length of approximately 60 degrees, for a total arc coverage of 120 degrees, although this is not required and the total arc length may be greater than or less than 120 degrees. The permanent magnet assembly 90 may be especially useful in rotating magnet applications which benefit from minimization of the rotational moment of inertia.

Figure 7:
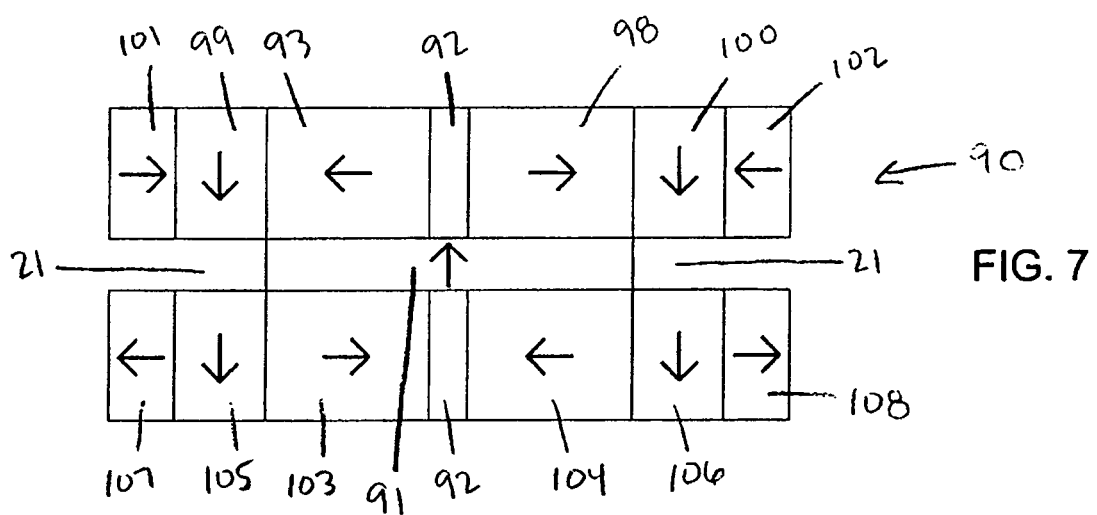
FIG. 7 is a cross-sectional view of the permanent magnet assembly of FIG. 6 taken along the line 7—7 thereof.

As perhaps best seen in FIG. 7, the permanent magnet assembly 90 is said to have axial gap flux, since the direction of magnetic flux through the air gaps 21 is substantially parallel to the axis of rotation 23. The permanent magnet assembly 90 is also said to have an internal flux return path, since the magnetic flux returns through a central path surrounding the axis of rotation 23 after crossing the air gap 21. The permanent magnet assembly 20 may be said to have straight configuration features, since it is comprised entirely of rectangular blocks with the exception of a disk magnet at the center with two flattened edges (the central axial magnet portion 91).

The permanent magnet assembly 90 includes a central axial magnet portion 91 formed of a disk magnet having flattened upper and lower faces, with a magnetization vector parallel to the axis of rotation 23. The central axial magnet portion preferably includes flattened lateral edges on each side, although this is not required. As perhaps best shown in FIG. 7, the upper face of the central axial magnet is a flux exit face, and the lower face of the central axial magnet is a flux entry face.

The central axial magnet portion 91 provides a return path for the lines of magnetic flux through the air gap 21. The central axial magnet portion 91 is preferably shaped and interiorly positioned at a sufficient distance from the air gap 21 to prevent shunting of the gap flux into the flux return path.

The upper portion of the permanent magnet assembly 90 preferably includes a central permeable slab 92, for example a block of low-carbon steel, surrounding the axis of rotation 23, although this is not required. The central permeable slab 92 serves to neutralize repulsive magnetic forces in the center of the assembly resulting from the adjacent permanent magnet portions.

The upper portion of the permanent magnet assembly 90 includes a first upper radial magnet portion 93 and a second upper radial magnet portion 98 adjacent to the central permeable slab 92, each upper radial magnet portion preferably formed of a rectangular block permanent magnet having a radial magnetization vector (normal to the axis of rotation 23).

Each of the upper radial magnet portions 93 and 98 has an exposed upper face, preferably rectangular or square in shape, and having an inside radial edge 94, an outside radial edge 95, a first lateral edge 96, and a second lateral edge 97. Each upper radial magnet portion has a hidden lower face (hidden in FIG. 6) directly below, opposite, and parallel to the exposed upper face, having approximately the same square or rectangular shape as the exposed upper face. The upper exposed faces and the parallel hidden lower faces of the upper magnet portion are all flux parallel faces.

Each upper radial magnet portion 93 and 98 has an inside radial face (hidden in FIG. 6), approximately rectangular in shape and extending downward from the inside radial edge 94 of the upper exposed face to the corresponding edge of the parallel hidden lower face. Opposite the inside radial face, each upper radial magnet portion 93 and 98 has an outside radial face (hidden in FIG. 6), approximately rectangular in shape and extending downward from the outside radial edge 95 of the upper exposed face to the corresponding edge of the parallel hidden lower face. As perhaps best shown in FIG. 7, the inside radial faces of the upper radial magnet portions 93 and 98 are flux entry faces, and the outside radial faces of the upper radial magnet portions 93 and 98 are flux exit faces.

Each upper radial magnet portion 93 and 98 has a first lateral face (hidden in FIG. 6), approximately rectangular in shape and extending downward from the first lateral edge 96 of the upper exposed face to the corresponding edge of the parallel hidden lower face. Each upper radial magnet portion also has a second lateral face (hidden in FIG. 6), approximately rectangular in shape and extending downward from the second lateral edge 97 of the upper exposed face to the corresponding edge of the parallel hidden lower face. The first and second lateral faces of the upper radial magnet portions 93 and 98 are all flux parallel faces.

The upper portion of the permanent magnet assembly 90 includes a first upper axial magnet portion 99 adjacent to the first upper radial magnet portion 93, and a second upper axial magnet portion 100 adjacent to the second upper radial magnet portion 98, each upper axial magnet portion preferably formed of a rectangular block permanent magnet having a magnetization vector parallel to the axis of rotation 23.

Each of the upper axial magnet portions 99 and 100 has an exposed upper face, preferably rectangular or square in shape. Each upper axial magnet portion has a hidden lower face (hidden in FIG. 6) directly below, opposite, and parallel to the exposed upper face, having approximately the same square or rectangular shape as the exposed upper face. The upper exposed faces of the upper axial magnet portions 99 and 100 are flux entry faces, and the hidden lower faces of the upper axial magnet portions 99 and 100 are flux exit faces.

The upper portion of the permanent magnet assembly 90 preferably includes a first upper radial blocking magnet portion 101 adjacent to the first upper axial magnet portion 99, and a second upper radial blocking magnet portion 102 adjacent to the second upper axial magnet portion 100, each upper radial blocking magnet portion preferably formed of a rectangular block permanent magnet having a radial magnetization vector (normal to the axis of rotation 23).

Each of the upper radial blocking magnet portions 101 and 102 has an inside radial face (hidden in FIG. 6), preferably rectangular or square in shape and coupled to an adjacent upper axial magnet portion. Each upper radial blocking magnet portion has an exposed outside radial face opposite and parallel to the hidden inside radial face, having approximately the same square or rectangular shape as the hidden inside face. The hidden inside radial faces of the upper radial blocking magnet portions 101 and 102 are flux exit faces, and the exposed outside radial faces of the upper radial blocking magnet portions 101 and 102 are flux entry faces.

The lower portion of the permanent magnet assembly 90 is similar to the upper portion of the permanent magnet assembly 90, with appropriate reversals of the magnetization vectors in the magnet portions. Like the upper portion, the lower portion of the permanent magnet assembly 90 includes a central permeable slab 92 surrounding the axis of rotation 23. Like the upper portion, the lower portion of the permanent magnet assembly 90 includes a first lower radial magnet portion 103 and a second lower radial magnet portion 104 on the sides of the central permeable slab 92. The lower radial magnet portions 103 and 104 are located directly below the corresponding first upper radial magnet portion 93 and second upper radial magnet portion 98.

As perhaps best shown in FIG. 7, the magnetization vectors in the lower radial magnet portions 103 and 104 point in directions opposite to the magnetization vectors in the corresponding upper radial magnet portions 93 and 98. Thus, the inside radial faces of the lower radial magnet portions 103 and 104 are flux exit faces and the outside radial faces are flux entry faces.

The lower portion of the permanent magnet assembly 90 includes a first lower axial magnet portion 105 adjacent to the first lower radial magnet portion 103, and a second lower axial magnet portion 106 adjacent to the second lower radial magnet portion 104. The lower axial magnet portions 105 and 106 are directly below the corresponding upper axial magnet portions of the upper portion of the permanent magnet assembly 90, having approximately the same square or rectangular shape, and preferably formed of a rectangular block permanent magnet.

The lower axial magnet portions 105 and 106 each have a magnetization vector parallel to the axis of rotation 23 and pointing in the same direction as the magnetization vectors in the corresponding upper axial magnet portions 99 and 100. Thus, the upper face of each of the lower axial magnet portions 105 and 106 is a flux entry face, and the lower face of each of the lower axial magnet portions 105 and 106 is a flux exit face.

Corresponding to the first upper radial blocking magnet portion 101, the lower portion of the permanent magnet assembly 90 preferably includes a first lower radial blocking magnet portion 107 adjacent to the first lower axial magnet portion 105. Corresponding to the second upper radial blocking magnet portion 102, the lower portion of the permanent magnet assembly 90 preferably includes a second lower radial blocking magnet portion 108 adjacent to the second lower axial magnet portion 106.

As perhaps best shown in FIG. 7, each lower radial blocking magnet portion is preferably formed of a rectangular block permanent magnet having a radial magnetization vector (normal to the axis of rotation 23). The inside radial faces of the lower radial blocking magnet portions 107 and 108 are flux entry faces, and the outside radial faces of the lower radial blocking magnet portions 107 and 108 are flux exit faces.

The permanent magnet assembly 90 preferably includes one or more lateral blocking magnet portions 109, each formed of a rectangular block permanent magnet. As best shown in FIG. 6, the lateral blocking magnet portions 109 preferably cover the lateral faces of the upper and lower radial magnet portions and central permeable slabs, and the junctions therebetween.

The magnetization vectors of the lateral blocking magnet portions 109 are radial (normal to the axis of rotation 23) at the center of the lateral blocking magnet portions 109. The hidden inside faces of the upper blocking magnet portions are flux exit faces, and the exposed outside faces of the upper blocking magnet portions are flux entry faces. Conversely, the hidden inside faces of the lower blocking magnet portions are flux entry faces, and the exposed outside faces of the upper blocking magnet portions are flux exit faces.

FIG. 7 is a cross-sectional view of the permanent magnet assembly of FIG. 6 taken along the line 7—7 thereof. The cross-sectional view of FIG. 7 shows how a first magnetic flux loop is formed by the lower axial magnet portion 105, the lower radial magnet portion 103, the central axial magnet portion 91, the upper radial magnet portion 93, the upper axial magnet portion 99, and a first air gap at high magnetic field 21. A second magnetic flux loop is formed by the lower axial magnet portion 106, the lower radial magnet portion 104, the central axial magnet portion 91, the upper radial magnet portion 98, the upper axial magnet portion 100, and a second air gap at high magnetic field 21.

Although not required, the lateral blocking magnet portions 109 prevent stray field from leaking into the nearby low field regions on each side of the permanent magnet assembly 90 (offset 90 degrees from the air gaps at high magnetic field 21). This also helps to ensure a sharp field decay away from the air gaps at high magnetic field 21 by forcing any stray flux outside the diameter of the annular region swept by rotation of the permanent magnet assembly 109.

Figure 8:
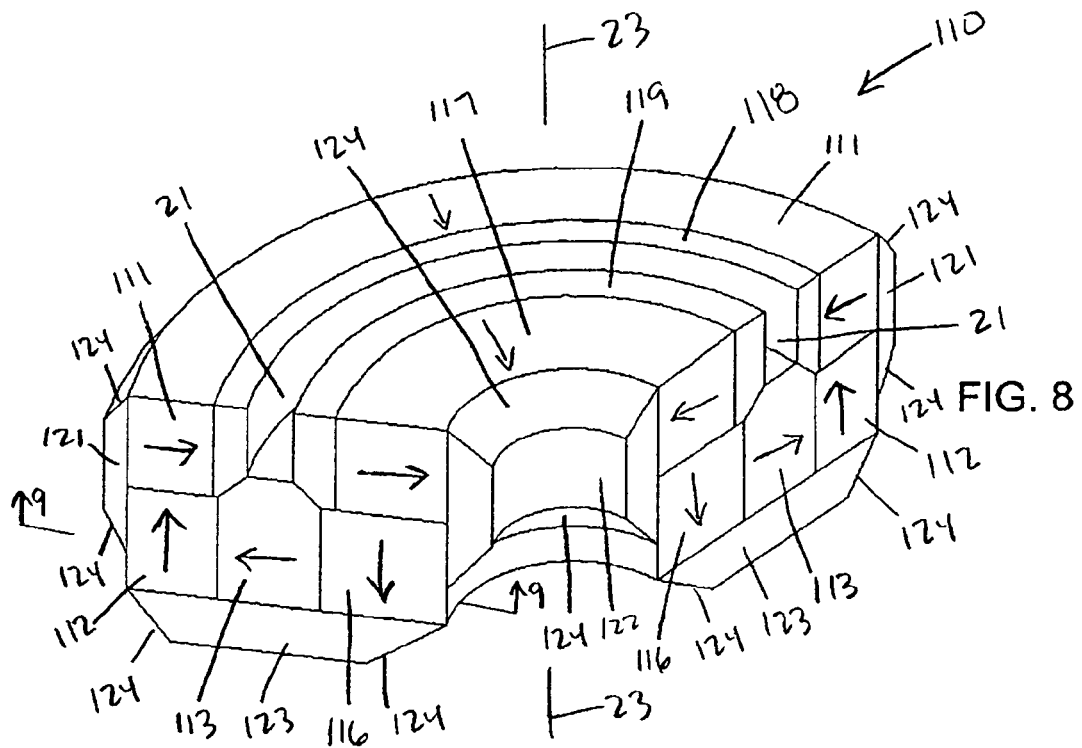
FIG. 8 is a perspective view of an embodiment of a permanent magnet assembly according to the invention having radial gap flux, a lower flux return path, and curved configuration features.

FIG. 8 is a perspective view of another embodiment of a permanent magnet assembly 110 according to the invention. The permanent magnet assembly 110 surrounds an air gap at high magnetic field 21 having a rectangular cross section. Although the cross-section of the air gap 21 is preferably rectangular, this is not necessary, and other shapes may be used.

Like the permanent magnet assemblies 20, 70, and 90 of FIGS. 1–7, the permanent magnet assembly 110 of FIG. 8 is adapted to rotate about an axis of rotation 23, whereby the air gap 21 sweeps an annular region having a rectangular cross section (not shown in FIG. 8). The air gap 21 of the permanent magnet assembly 110 covers an arc length of approximately 120 degrees, although this is not required and the arc length may be greater than or less than 120 degrees.

Figure 9:
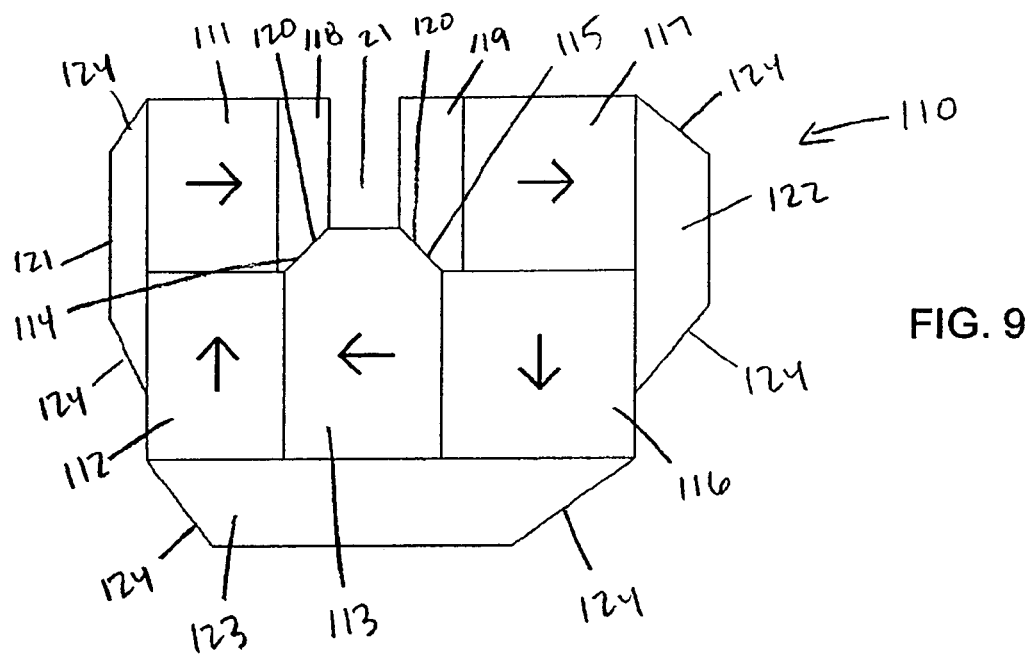
FIG. 9 is a cross-sectional view of the permanent magnet assembly of FIG. 8 taken along the line 9—9 thereof.

As perhaps best seen in FIG. 9, the permanent magnet assembly 110 is said to have radial gap flux, since the direction of magnetic flux through the air gap 21 is substantially normal (perpendicular) to the axis of rotation 23. The permanent magnet assembly 110 is also said to have a lower flux return path, since the magnetic flux returns through a path below the air gap 21 after crossing the air gap 21. The permanent magnet assembly 110 may be said to have curved configuration features, since it is formed of blocks having curved surfaces.

It has been observed through modeling that a permanent magnet assembly with radial gap flux, such as the permanent magnet assembly 110, may suffer in flux density per unit mass compared to a permanent magnet assembly having axial gap flux. This is presumed to be the result of focusing flux lines in the air gap to be as close together as possible, and therefore parallel, while also requiring the flux lines to be tangent to the curved magnet surface everywhere they cross into the air gap. This conflict of interests result in a distortion of the flux lines leading to flux leakage, field cancellation, and field non-uniformity. These negative effects can be countered by minimizing the ratio of the radial width of the air gap to the distance of the air gap from the central axis of the annular region.

The permanent magnet assembly 110 includes an exterior radial magnet portion 111 formed as an arc-shaped solid having six faces, a rectangular or square cross-section, and a radial magnetization vector extending substantially normal to the axis of rotation 23. The exterior radial magnet portion 111 can be formed of a single piece or multiple pieces.

The inside radial face (hidden in FIG. 8) of the exterior radial magnet portion 111 is the face nearest to the axis of rotation and normal to a radius extending from the axis of rotation. The outside radial face (also hidden in FIG. 8) of the exterior radial magnet portion 111 is the face farthest from the axis of rotation and normal to a radius extending from the axis of rotation. The inside radial face of the exterior radial magnet portion 111 is a flux exit face, and the outside radial face of the exterior radial magnet portion 111 is a flux entry face.

The upper face of the exterior radial magnet portion 111 (exposed in FIG. 8) and the lower face of the exterior radial magnet portion 111 (hidden in FIG. 8) are both flux parallel faces.

The first and second circumferential faces of the exterior radial magnet portion 111 are the faces forming the ends of the exterior radial magnet portion 111. The first and second circumferential faces of the exterior radial magnet portion 111 are both flux parallel faces.

The permanent magnet assembly 110 includes an exterior axial magnet portion 112 formed as an arc-shaped solid having six faces, a rectangular or square cross-section, and an axial magnetization vector extending substantially parallel to the axis of rotation 23. The exterior axial magnet portion 112 can be formed of a single piece or multiple pieces.

The inside radial face (hidden in FIG. 8) of the exterior axial magnet portion 112 is the face nearest to the axis of rotation and normal to a radius extending from the axis of rotation. The outside radial face (partially exposed in FIG. 8) of the exterior axial magnet portion 112 is the face farthest from the axis of rotation and normal to a radius extending from the axis of rotation. The inside radial face and outside radial face of the exterior axial magnet portion 112 are both flux parallel faces.

The upper face of the exterior axial magnet portion 112 (hidden in FIG. 8) is a flux exit face, and the lower face of the exterior axial magnet portion 112 (hidden in FIG. 8) is a flux entry face.

The first and second circumferential faces of the exterior axial magnet portion 112 are the faces forming the ends of the exterior axial magnet portion 112. The first and second circumferential faces of the exterior axial magnet portion 112 are both flux parallel faces.

The permanent magnet assembly 110 includes a central radial magnet portion 113 formed as an arc-shaped solid having six faces, a rectangular or square cross-section, and a magnetization vector extending substantially in a radial direction (normal to the axis of rotation 23). The central radial magnet portion 113 can be formed of multiple pieces, or it can be formed of a single piece.

The inside radial face of the central radial magnet portion 113 is the face nearest to the axis of rotation and normal to a radius extending from the axis of rotation. The outside radial face of the central radial magnet portion 113 is the face farthest from the axis of rotation and normal to a radius extending from the axis of rotation. The inside radial face of the central radial magnet portion 113 is a flux entry face, and the outside radial face of the central radial magnet portion 113 is a flux exit face.

The upper face and the lower face of the central radial magnet portion 113 are both flux parallel faces. The outside corner of the upper face of the central radial magnet portion 113 preferably includes an exterior chamfer 114, and the inside corner preferably includes an interior chamfer 115, although this is not required.

The first and second circumferential faces of the central radial magnet portion 113 are the faces forming the ends of the central radial magnet portion 113. As shown in FIG. 8, the first and second circumferential faces of the central radial magnet portion 113 are both flux parallel faces.

The central radial magnet portion 113 provides a return path for the lines of magnetic flux through the air gap 21. The central radial magnet portion 113 is preferably shaped and positioned at a sufficient distance from the air gap 21 to prevent shunting of the gap flux into the flux return path.

The permanent magnet assembly 110 includes an interior axial magnet portion 116 formed as an arc-shaped solid having six faces, a rectangular or square cross-section, and an axial magnetization vector extending substantially parallel to the axis of rotation 23. The interior axial magnet portion 116 can be formed of a single piece or multiple pieces.

The inside radial face (partially exposed in FIG. 8) of the interior axial magnet portion 116 is the face nearest to the axis of rotation and normal to a radius extending from the axis of rotation. The outside radial face (hidden in FIG. 8) of the interior axial magnet portion 116 is the face farthest from the axis of rotation and normal to a radius extending from the axis of rotation. The inside radial face and outside radial face of the interior axial magnet portion 116 are both flux parallel faces.

The upper face of the interior axial magnet portion 116 (hidden in FIG. 8) is a flux entry face, and the lower face of the interior axial magnet portion 116 (hidden in FIG. 8) is a flux exit face.

The first and second circumferential faces of the interior axial magnet portion 116 are the faces forming the ends of the interior axial magnet portion 116. The first and second circumferential faces of the interior axial magnet portion 116 are both flux parallel faces.

The permanent magnet assembly 110 includes an interior radial magnet portion 117 formed as an arc-shaped solid having six faces, a rectangular or square cross-section, and a radial magnetization vector extending substantially normal to the axis of rotation 23. The interior radial magnet portion 117 can be formed of a single piece or multiple pieces.

The inside radial face (hidden in FIG. 8) of the interior radial magnet portion 117 is the face nearest to the axis of rotation and normal to a radius extending from the axis of rotation. The outside radial face (also hidden in FIG. 8) of the interior radial magnet portion 117 is the face farthest from the axis of rotation and normal to a radius extending from the axis of rotation. The inside radial face of the interior radial magnet portion 117 is a flux exit face, and the outside radial face of the interior radial magnet portion 117 is a flux entry face.

The first and second circumferential faces of the interior radial magnet portion 117 are the faces forming the ends of the interior radial magnet portion 117. The first and second circumferential faces of the interior radial magnet portion 117 are both flux parallel faces.

The permanent magnet assembly 110 preferably includes an exterior pole piece 118 and an interior pole piece 119 surrounding the air gap at high magnetic field 21. The exterior pole piece 118 and interior pole piece 119 are each formed as an arc-shaped solid, and preferably include at least one chamfer 120, although this is not required.

The exterior radial face of the exterior pole piece 118 is preferably coupled to the interior radial face of the exterior radial magnet portion 111. The interior radial face of the exterior pole piece 118 preferably faces the air gap at high magnetic field 21. The chamfer 120 of the exterior pole piece 118 is preferably coupled to the exterior chamfer 114 of the central radial magnet portion 113.

The interior radial face of the interior pole piece 119 is preferably coupled to the exterior radial face of the interior radial magnet portion 117. The exterior radial face of the interior pole piece 119 preferably faces the air gap at high magnetic field 21. The chamfer 120 of the interior pole piece 119 is preferably coupled to the interior chamfer 115 of the central radial magnet portion 113.

The permanent magnet assembly 110 preferably includes an exterior sheath 121 formed of magnetically permeable material. The exterior sheath 121 preferably has a trapezoidal cross-section, with upper and lower chamfers 124, although this is not required and other shapes may be used. The exterior sheath 121 preferably covers the junction between the exterior radial magnet portion 111 and the exterior axial magnet portion 112, and at least a portion of the exposed faces of the exterior radial magnet portion 111 and the exterior axial magnet portion 112.

The permanent magnet assembly 110 also preferably includes an interior sheath 122 formed of magnetically permeable material. The interior sheath 122 preferably has a trapezoidal cross-section, with upper and lower chamfers 124, although this is not required and other shapes may be used. The interior sheath 122 preferably covers the junction between the interior axial magnet portion 116 and the interior radial magnet portion 117, and at least a portion of the exposed faces of interior axial magnet portion 116 and the interior radial magnet portion 117.

The permanent magnet assembly 70 preferably includes a lower sheath 123 formed of magnetically permeable material. The lower sheath 123 preferably has a trapezoidal cross-section, with inside and outside chamfers 124, although this is not required and other shapes may be used. The lower sheath 123 preferably covers at least a portion of the exposed faces of each of the exterior axial magnet portion 112, the central radial magnet portion 113, and the interior axial magnet portion 116, and the junctions therebetween.

FIG. 9 is a cross-sectional view of the permanent magnet assembly 110 of FIG. 8 taken along the line 9-9 thereof. The cross-sectional view of FIG. 9 shows how a magnetic flux loop is formed by the interior radial magnet portion 117, the interior axial magnet portion 116, the central radial magnet portion 113, the exterior axial magnet portion 112, the exterior radial magnet portion 111, and the air gap at high magnetic field 21.

Although not required, the permanent magnet assembly 110 preferably includes the exterior pole piece 118 and interior pole piece 119 surrounding the air gap at high magnetic field 21 to guide and concentrate the magnetic flux through the air gap at high magnetic field 21.

Although not required, the permanent magnet assembly 110 preferably includes the exterior sheath 121, interior sheath 122, and lower sheath 123 to reduce flux leakage from the assembly.

As perhaps best shown in FIG. 9, the interior axial magnet 116 and interior radial magnet 117 on the near side of the air gap 21 from the axis of rotation 23 preferably have a greater cross-sectional area than the exterior axial magnet 112 and exterior radial magnet 111 on the far side of the air gap 21 to help equalize their relative volumes and flux capacity, and thereby prevent over-saturation and flux leakage on the inner radius side. Similarly, the interior pole piece 119 preferably has a greater cross-sectional area than the exterior pole piece 118 on the far side of the air gap 21 to help equalize their relative volumes and flux capacity.

Figure 10:
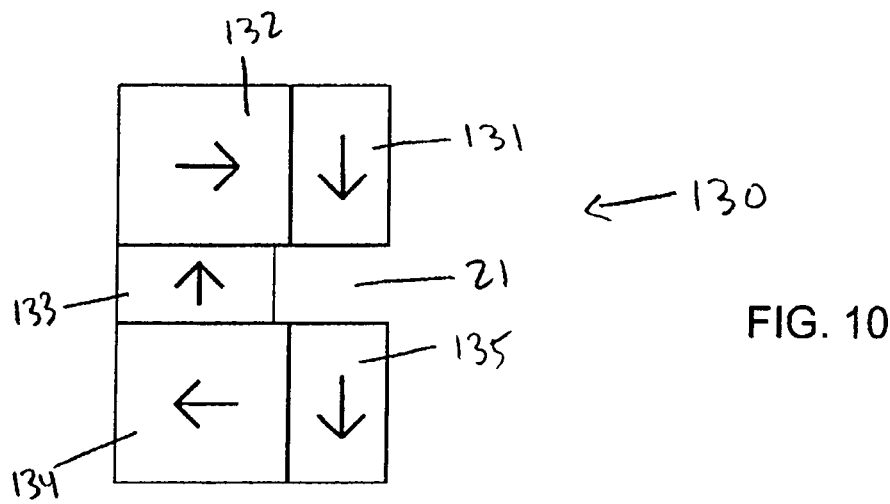
FIG. 10 is a cross-sectional view of a permanent magnet assembly according to the invention having a simple array construction.

FIG. 10 is a cross-sectional view of a permanent magnet assembly according to the invention 130 having a simple array construction. The cross-sectional view of FIG. 10 shows how a magnetic flux loop is formed by the lower gap field parallel magnet 135, the lower gap field normal magnet 134, the central gap field parallel magnet 133, the upper gap field normal magnet 132, the upper gap field parallel magnet 131, and the air gap at high magnetic field 21.

Figure 11:
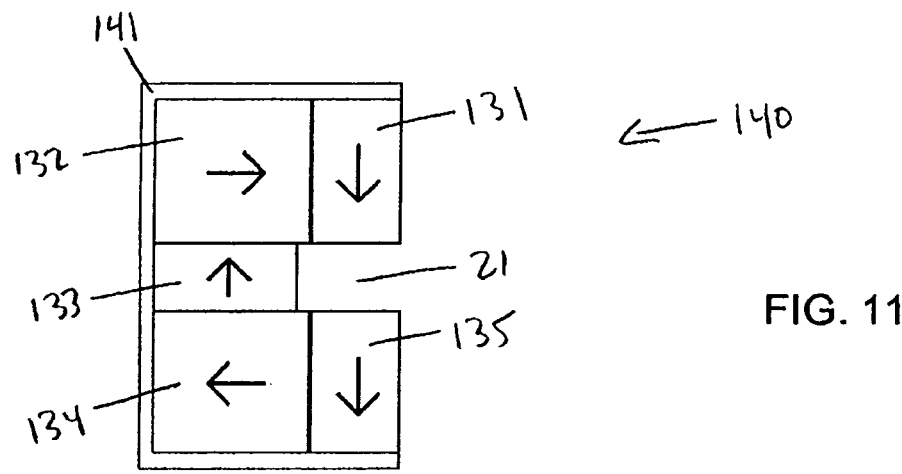
FIG. 11 is a cross-sectional view of a permanent magnet assembly according to the invention having a simple array construction with a simple outer sheath.

FIG. 11 is a cross-sectional view of a permanent magnet assembly 140 according to the invention having a simple array construction with a simple flux containment jacket. The cross-sectional view of FIG. 11 shows how a magnetic flux loop is formed by the lower gap field parallel magnet 135, the lower gap field normal magnet 134, the central gap field parallel magnet 133, the upper gap field normal magnet 132, the upper gap field parallel magnet 131, and the air gap at high magnetic field 21.

The permanent magnet assembly 140 includes a simple flux containment jacket 141 used to minimize stray flux. The simple flux containment jacket 141 is a magnetically permeable, stray flux containment jacket, made of a magnetically permeable material such as low-carbon steel, Vanadium Cobalt Iron alloy, or some other highly permeable alloy.

Figure 12:
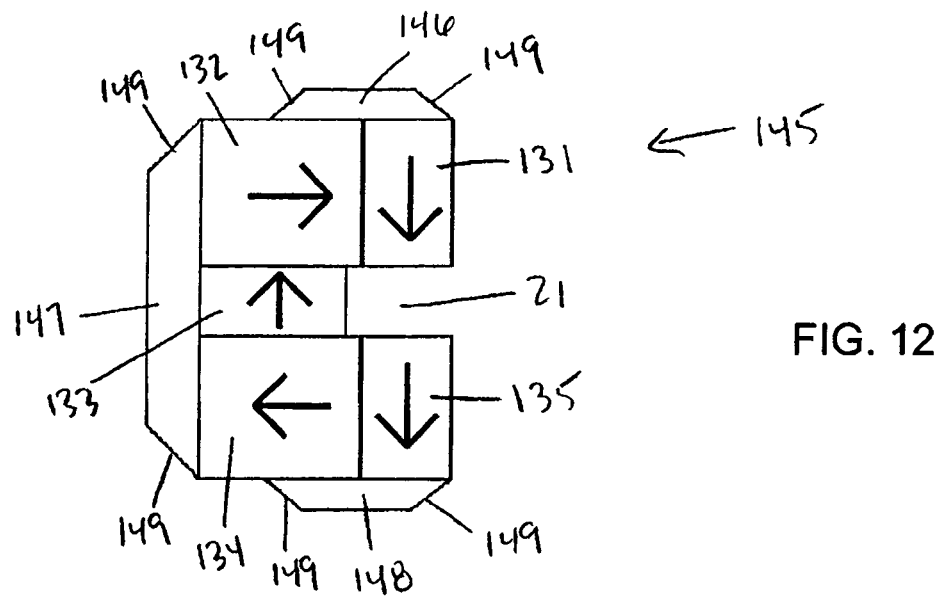
FIG. 12 is a cross-sectional view of a permanent magnet assembly according to the invention having a simple array construction with a complex outer sheath.

FIG. 12 is a cross-sectional view of a permanent magnet assembly according to the invention 145 having a simple array construction with multiple flux containment sheaths. The cross-sectional view of FIG. 12 shows how a magnetic flux loop is formed by the lower gap field parallel magnet 135, the lower gap field normal magnet 134, the central gap field parallel magnet 133, the upper gap field normal magnet 132, the upper gap field parallel magnet 131, and the air gap at high magnetic field 21.

The permanent magnet assembly 145 includes multiple flux containment sheaths used to minimize stray flux, including an upper containment sheath 146, a central containment sheath 147, and a lower containment sheath 148. Each flux containment sheath may include one or more chamfers 149. Compared to the simple flux containment jacket 141 of FIG. 11, the use of multiple flux containment sheaths shown in FIG. 12 is better suited to redirect stray flux into the magnetic circuit; however, it also increases the difficulty of manufacturing and assembly.

Figure 13:
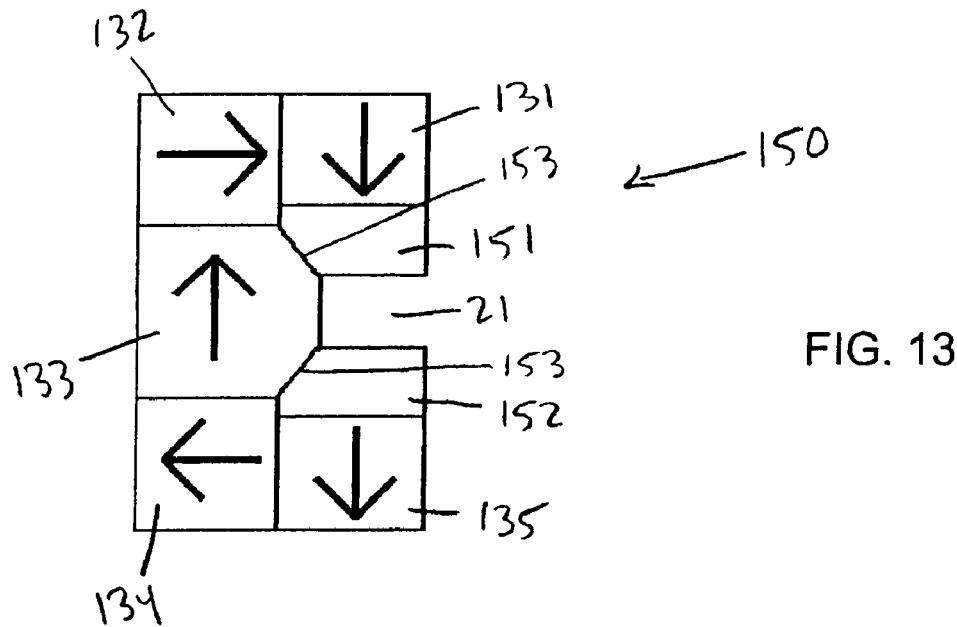
FIG. 13 is a cross-sectional view of a permanent magnet assembly according to the invention having a simple array construction with tapered pole pieces.

FIG. 13 is a cross-sectional view of a permanent magnet assembly according to the invention 150 having a simple array construction with tapered pole pieces. The cross-sectional view of FIG. 13 shows how a magnetic flux loop is formed by the lower gap field parallel magnet 135, the lower gap field normal magnet 134, the central gap field parallel magnet 133, the upper gap field normal magnet 132, the upper gap field parallel magnet 131, and the air gap at high magnetic field 21.

The permanent magnet assembly 150 includes pole pieces surrounding the air gap at high magnetic field 21, including an upper gap pole piece 151 and a lower gap pole piece 152. Each pole piece may include one or more chamfers or tapers 153. Compared to the simple array construction of FIG. 10, the use of tapered magnetically permeable pole pieces surrounding the air gap 21 can allow for flux densities within the magnetic circuit eclipsing the saturation flux density of the sintered magnet compound being used, thereby achieving a higher magnetic field in the air gap for a given mass of the assembly. However, assembly cost and scrap material would likely increase from the introduction of a non-rectilinear magnet block to the circuit.

Figure 14:
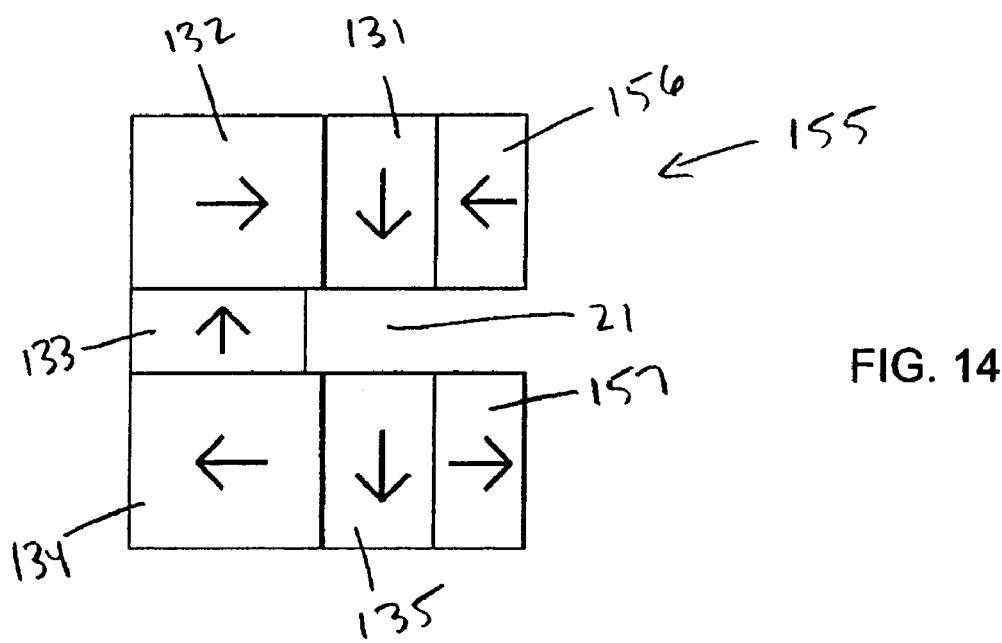
FIG. 14 is a cross-sectional view of a permanent magnet assembly according to the invention having a simple array construction with magnetic blocking poles.

FIG. 14 is a cross-sectional view of a permanent magnet assembly according to the invention having a simple array construction with magnetic blocking poles. The cross-sectional view of FIG. 14 shows how a magnetic flux loop is formed by the lower gap field parallel magnet 135, the lower gap field normal magnet 134, the central gap field parallel magnet 133, the upper gap field normal magnet 132, the upper gap field parallel magnet 131, and the air gap at high magnetic field 21.

The permanent magnet assembly 155 includes blocking magnets, including an upper gap field normal blocking magnet 156 and a lower gap field normal blocking magnet 157. Compared to the simple array construction of FIG. 10, the use of blocking magnets can provide a higher magnetic field in the air gap, but at an increased cost due to the additional magnets and assembly required.

Figure 15:
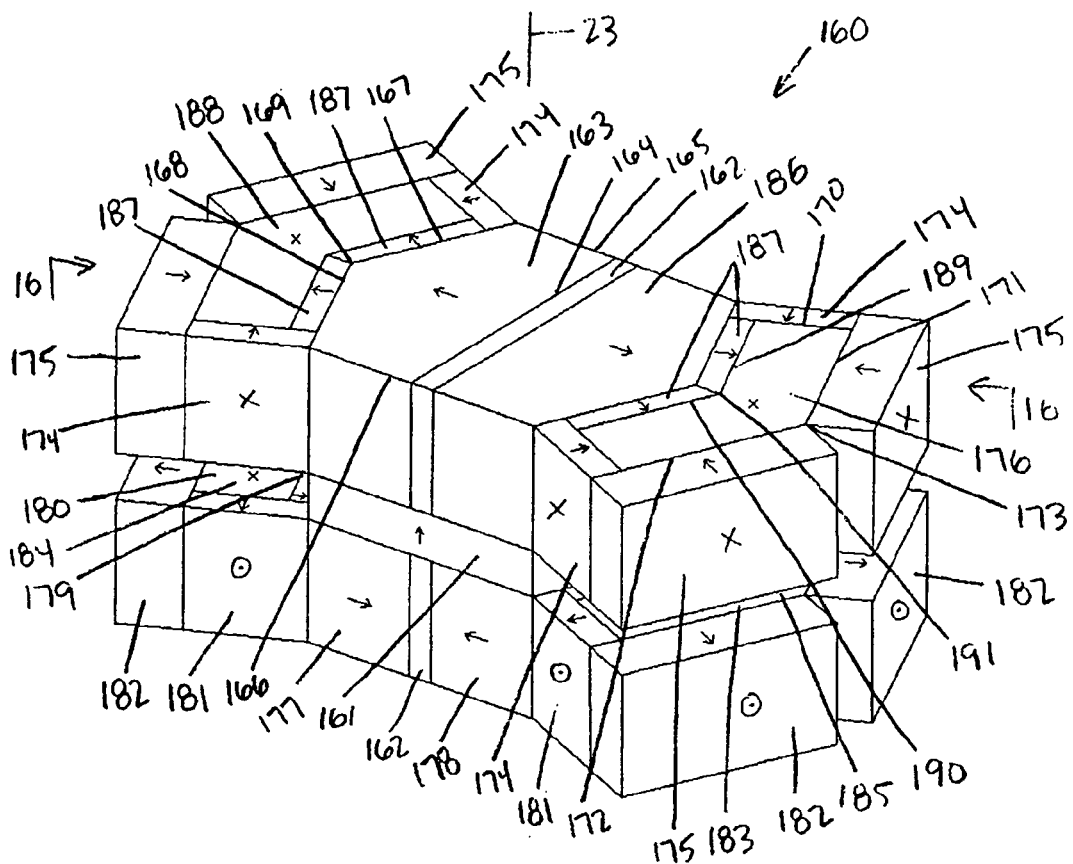
FIG. 15 is a top perspective view of another permanent magnet assembly according to the invention having axial gap flux, an interior flux return path, and V-shaped gap regions at each end of the assembly.

FIG. 15 is a perspective view of another embodiment of a permanent magnet assembly 160 according to the invention. The permanent magnet assembly 160 has an interior flux return path, and provides axial gap flux through two V-shaped air gaps 184 and 185 at high magnetic field having a rectangular cross section, where both air gaps 184 and 185 experience the same direction of magnetic flux. Although the cross-sections of the air gaps 184 and 185 are preferably rectangular, this is not necessary, and other shapes may be used.

The permanent magnet assembly 160 of FIG. 15 is adapted to rotate about an axis of rotation 23, whereby the air gaps 184 and 185 sweep an annular region having a rectangular cross section (not shown in FIG. 15). The air gaps 184 and 184 of the permanent magnet assembly 160 each cover an arc length of approximately 60 degrees, for a total arc coverage of 120 degrees, although this is not required and the total arc length may be greater than or less than 120 degrees. The permanent magnet assembly 160 may be especially useful in rotating magnet applications which benefit from minimization of the rotational moment of inertia.

Figure 16:
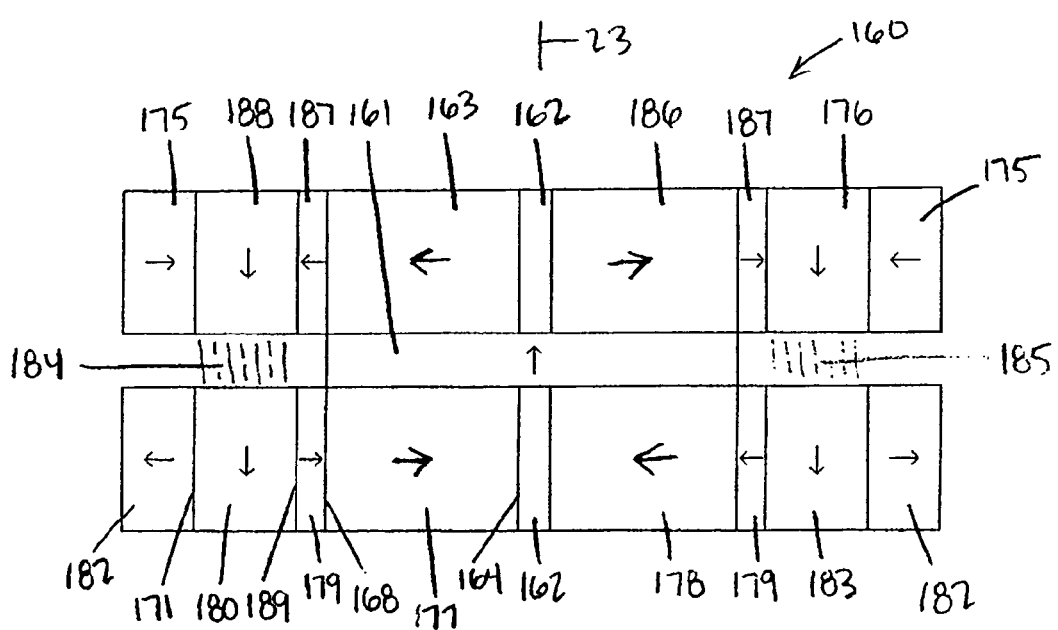
FIG. 16 is a cross-sectional view of the permanent magnet assembly of FIG. 15 taken along the line 16—16 thereof.

As perhaps best seen in FIG. 16, the permanent magnet assembly 160 is said to have axial gap flux, since the direction of magnetic flux through the air gaps 184 and 185 is substantially parallel to the axis of rotation 23. The permanent magnet assembly 160 is also said to have an internal flux return path, since the magnetic flux returns through a central path surrounding the axis of rotation 23 after crossing the air gaps 184 and 185. The permanent magnet assembly 160 includes mostly rectangular blocks, with some exceptions. The major radial magnets 163, 186, 177, and 178 are formed as solids having a pentagonal cross-section, and can be formed, for example, from a rectangular block with two straight cuts. The axial gap magnets 188, 176, 180, and 183 are formed as solids having a V-shaped cross-section, and can be formed from a rectangular block with four straight cuts. The axial gap magnets 188, 176, 180, and 183 could also be formed as arc-shaped solids having a rectangular cross-section instead of being V-shaped The central axial magnet 161 is preferably formed as a disk magnet with two flattened side edges, although other shapes could be used such as a rectangular or hexagonal block.

The permanent magnet assembly 160 includes a central axial magnet portion 161 formed of a disk magnet having flattened upper and lower faces, with a magnetization vector parallel to the axis of rotation 23. The central axial magnet portion 161 preferably includes flattened lateral edges on each side, although this is not required. As perhaps best shown in FIG. 16, the upper face of the central axial magnet 161 is a flux exit face, and the lower face of the central axial magnet 161 is a flux entry face.

The central axial magnet portion 161 provides a return path for the lines of magnetic flux through the air gaps 184 and 185. The central axial magnet portion 161 is preferably shaped and interiorly positioned at a sufficient distance from the air gaps 184 and 185 to prevent shunting of the gap flux into the flux return path.

The upper portion of the permanent magnet assembly 160 preferably includes a central permeable slab 162, for example a block of low-carbon steel, surrounding the axis of rotation 23, although this is not required. The central permeable slab 162 serves to neutralize repulsive magnetic forces in the center of the assembly resulting from the adjacent permanent magnet portions.

The upper portion of the permanent magnet assembly 160 includes a first upper major radial permanent magnet portion 163 and a second upper major radial magnet permanent portion 186 adjacent to the central permeable slab 162, each upper major radial magnet portion preferably formed as a polyhedral solid having a pentagonal cross-section and a radial magnetization vector (normal to the axis of rotation 23). The permanent magnet assembly 160 includes similar lower major radial permanent magnet portions 177 and 178.

Each of the upper major radial magnet portions 163 and 186 has an exposed upper face, preferably pentagonal in shape, and having an inside radial edge 164, a first lateral edge 165, a second lateral edge 166, a first outside radial edge 167, and a second outside radial edge 168. The first outside radial edge 167 and the second outside radial edge 168 meet at a point 169. Each upper major radial magnet portion has a hidden lower face (hidden in FIG. 15) directly below, opposite, and parallel to the exposed upper face, having approximately the same pentagonal shape as the exposed upper face. The upper exposed faces and the parallel hidden lower faces of the upper major radial magnet portions are all flux parallel faces.

Each upper major radial magnet portion 163 and 186 has an inside radial face (hidden in FIG. 15), approximately rectangular in shape and extending downward from the inside radial edge 164 of the upper exposed face to the corresponding edge of the parallel hidden lower face.

Opposite the inside radial face, each upper major radial magnet portion 163 and 186 has first and second outside radial faces (hidden in FIG. 15), approximately rectangular in shape and extending downward from the first and second outside radial edges 167 and 168, respectively, of the upper exposed face to the corresponding edges of the parallel hidden lower face.

Each major radial permanent magnet portion is preferably formed, for example, with two straight cuts from a rectangular block permanent magnet. When formed in this manner, as perhaps best shown in FIG. 16, the inside radial faces of the upper major radial magnet portions 163 and 186 are flux entry faces. When formed in this manner, the magnetic flux lines exit at an angle from the first and second outside radial faces of each of the upper major radial magnet portions 163 and 186, so those faces are at least partially flux exit faces.

Alternatively, each major radial permanent magnet portion can be formed, for example, by joining two pieces along a line from the major radial magnet point 169 to the midpoint of the major radial magnet inside radial edge 164, possibly including a permeable slab at the junction between the two pieces. When formed in this manner, it is possible to align the magnetic vectors in each of the two pieces so that the magnetic flux lines exit perpendicularly from the first and second outside radial faces of the upper major radial magnet portions 163 and 186, so those faces are flux exit faces. When formed in this manner with the magnetic vectors in the two pieces so aligned, the inside radial face of the upper major radial magnet portion is at least partially a flux entry face since the lines of magnetic flux are at an angle to the inside radial faces.

The permanent magnet assembly 160 preferably includes four upper minor radial permanent magnet portions 187, one upper minor radial permanent magnet portion 187 positioned adjacent to each of the first and second outside radial faces of each of the upper radial magnet portions 163 and 186, although this is not required. Each minor radial permanent magnet portion 187 can be formed, for example, as a rectangular block permanent magnet.

If used, each upper minor radial permanent magnet portion 187 includes an inside radial face (not shown in FIG. 15) magnetically coupled to an outside radial face of an adjacent upper major radial magnet portion. Each upper minor radial permanent magnet portion 187 also includes an outside radial face (not shown in FIG. 15) opposite and substantially parallel to its inside radial face. As perhaps best shown in FIG. 16, the inside radial faces of the upper minor radial magnet portions 187 are flux entry faces, and the outside radial faces of each of the upper minor radial magnet portions 187 are flux exit faces.

The upper portion of the permanent magnet assembly 160 includes a first upper axial permanent magnet portion 188 magnetically coupled to its adjacent upper minor radial permanent magnet portions 187, and a second upper axial permanent magnet portion 176 magnetically coupled to its adjacent upper minor radial permanent magnet portions 187. Each upper axial permanent magnet portion is preferably formed as a V-shaped polyhedral solid and an axial magnetization vector (parallel to the axis of rotation 23). The permanent magnet assembly 160 includes similar lower axial permanent magnet portions 180 and 183.

Each of the upper axial magnet portions 176 and 188 has an exposed upper face, preferably V-shaped, having two lateral edges 170 on each side, a first inside radial edge 189 and a second inside radial edge 190 which meet at an inside point 191, and a first outside radial edge 171 and a second outside radial edge 172 which meet at an outside point 173. Each upper axial permanent magnet portion can be formed, for example, of two pieces, where each piece is formed from a rectangular block permanent magnet with a single straight cut, and then joining the two pieces along their cut faces (along a line between the inside point 191 and the outside point 173) to form a V.

Each upper axial magnet portion 176 and 188 has a hidden lower face (hidden in FIG. 15) directly below, opposite, and parallel to its exposed upper face, having approximately the same V-shape as the exposed upper face. The upper exposed face of the upper axial magnet portions 176 and 188 are flux entry faces, and the lower faces of the upper axial magnet portions are flux exit faces.

Each upper axial magnet portion 176 and 188 has a first inside radial face and a second inside radial face (hidden in FIG. 15), approximately rectangular in shape and extending downward from the first inside radial edge 189 and second inside radial edge 190, respectively, of the upper exposed face to the corresponding edge of the parallel hidden lower face.

Opposite the first and second inside radial faces, each upper axial magnet portion 176 and 188 has first and second outside radial faces (hidden in FIG. 15), approximately rectangular in shape and extending downward from the first outside radial edge 171 and second outside radial edges 172, respectively, of the upper exposed face to the corresponding edges of the parallel hidden lower face.

Each upper axial magnet portion 176 and 188 also has first and second lateral faces (hidden in FIG. 15), approximately rectangular in shape and extending downward from the lateral edges 170 of the upper exposed face to the corresponding edges of the parallel hidden lower face. The inside radial faces, the outside radial faces, and the lateral faces of the upper axial magnet portions 176 and 188 are all flux parallel faces.

Each upper axial magnet portion 176 and 188 is preferably at least partially surrounded by one or more upper lateral blocking magnets 174 and/or upper radial blocking magnets 175. The upper lateral blocking magnets 174 and/or upper radial blocking magnets 175, if used, are each preferably formed of a rectangular block magnet.

If used, each upper lateral blocking magnet 174 preferably has an inside lateral face (not shown in FIG. 15) which is magnetically coupled to a lateral face of its adjacent upper axial magnet. Portions of the inside lateral face of each upper lateral blocking magnet 174 can also be magnetically coupled to portions of a lateral face of an adjacent upper minor radial magnet, although this is not required. The inside lateral face of each upper lateral blocking magnet 174 is opposite and substantially parallel to an exposed outside lateral face. The outside lateral face of each upper lateral blocking magnet 174 is a flux entry face, and the inside lateral face of each upper lateral blocking magnet is a flux exit face.

If used, each upper radial blocking magnet 175 preferably has an inside radial face (not shown in FIG. 15) which is magnetically coupled to an outside radial face of its adjacent upper axial magnet. Portions of the inside radial face of each upper radial blocking magnet 175 can also be magnetically coupled to portions of an adjacent upper lateral blocking magnet, although this is not required. The inside radial face of each upper radial blocking magnet 175 is opposite and substantially parallel to an exposed outside radial face. The outside radial face of each upper radial blocking magnet 175 is a flux entry face, and the inside radial face of each upper radial blocking magnet is a flux exit face.

The lower portion of the permanent magnet assembly 160 is similar to the upper portion of the permanent magnet assembly 160, with appropriate reversals of the magnetization vectors in the magnet portions. Like the upper portion, the lower portion of the permanent magnet assembly 160 includes a central permeable slab 162 surrounding the axis of rotation 23. Like the upper portion, the lower portion of the permanent magnet assembly 160 includes a first lower major radial magnet portion 177 and a second lower major radial magnet portion 178 on the sides of the central permeable slab 162. The lower major radial magnet portions 177 and 178 are located directly below the corresponding upper major radial magnet portions 163 and 186, respectively.

As perhaps best shown in FIG. 16, the magnetization vectors in the lower major radial magnet portions 177 and 178 point in directions opposite to the magnetization vectors in the corresponding upper major radial magnet portions 163 and 186. Thus, the inside radial faces of the lower major radial magnet portions 177 and 178 are flux exit faces and the outside radial faces are flux entry faces. In the cross-section of FIG. 16, the magnetization vectors in the radial magnet portions 163, 186, 177, and 178 are not exactly parallel to the plane of the page, because the cross section is taken at the angle of the line 16—16 in FIG. 15, but the arrows in FIG. 16 show the general direction of the magnetization vectors.

The lower portion of the permanent magnet assembly 160 preferably includes lower minor radial magnet portions 179 adjacent to the first major lower radial magnet portions 177 and 178. If used, the lower minor radial magnet portions 179 are directly below the corresponding upper minor radial magnet portions 187 of the upper portion of the permanent magnet assembly 160, having approximately the same square or rectangular shape, and preferably formed of a rectangular block permanent magnet, but with opposite magnetic vectors.

The lower portion of the permanent magnet assembly 160 includes a first lower axial permanent magnet portion 180 and a second lower axial permanent magnet portion 183, each magnetically coupled to its adjacent lower minor radial permanent magnet portions 187. The first and second lower axial magnet portions 180 and 183 are directly below the corresponding first and second upper axial magnet portions 188 and 176, respectively, of the upper portion of the permanent magnet assembly 160, having approximately the same V-shape, and preferably formed in the same fashion. As perhaps best shown in FIG. 16, the magnetization vectors of the lower axial magnet portions 180 and 183 and the upper axial magnet portions 188 and 176 are all axial (parallel to the axis of rotation 23), and all in the same direction.

Each lower axial magnet portion 180 and 183 is preferably at least partially surrounded by one or more lower lateral blocking magnets 181 and/or lower radial blocking magnets 182. If used, the lower lateral blocking magnets 181 are directly below the corresponding upper lateral blocking magnets 174 of the upper portion of the permanent magnet assembly 160, having approximately the same square or rectangular shape, and preferably formed of a rectangular block permanent magnet, but with opposite magnetic vectors. If used, the lower radial blocking magnets 182 are directly below the corresponding upper radial blocking magnets 175 of the upper portion of the permanent magnet assembly 160, having approximately the same square or rectangular shape, and preferably formed of a rectangular block permanent magnet, but with opposite magnetic vectors.

FIG. 16 is a cross-sectional view of the permanent magnet assembly of FIG. 15 taken along the line 16—16 thereof. The cross-sectional view of FIG. 16 shows how a first magnetic flux loop is formed by the first lower axial magnet portion 180, the lower minor radial magnet portions 179, the first lower major radial magnet portion 177, the central axial magnet 161, the first upper major radial magnet portion 163, the upper minor radial magnet portions 187, the first upper axial magnet portion 188, and a first air gap at high magnetic field 184. A second magnetic flux loop is formed by the second lower axial magnet portion 183, the lower minor radial magnet portions 179, the second lower major radial magnet portion 178, the central axial magnet 161, the second upper major radial magnet portion 186, the upper minor radial magnet portions 187, the second upper axial magnet portion 176, and a second air gap at high magnetic field 185.

Although not required, the lateral blocking magnet portions 174 and 181, and the radial blocking magnet portions 175 and 182, concentrate the magnetic flux through the gaps 184 and 185, and help reduce stray field leaking into the nearby low field regions on each side of the permanent magnet assembly 160 (offset 90 degrees from the air gaps at high magnetic field 184 and 185). This also helps to ensure a sharp field decay away from the air gaps at high magnetic field 184 and 185 by forcing any stray flux outside the diameter of the annular region swept by rotation of the permanent magnet assembly 109.

There are various possibilities with regard to alternative embodiments and applications of a permanent magnet assembly according to the invention. Although the exemplary embodiments of the present invention refer to specific materials, other materials known to those skilled in the art as having suitable properties can be appropriately substituted.

A variety of structures can be used in a permanent magnet assembly according to the invention. For example, the permanent magnets shown in the illustrative embodiments herein may each comprise a single permanent magnet, or one or more of these permanent magnet sections may be a composite structure comprised of one or more multiple permanent magnets and one or more sections of magnetically permeable material.

For example, one or more rectangular permanent magnet sections may be operatively coupled to an arc-shaped pole piece to obtain a structure which is the equivalent of an arc-shaped permanent magnet section. The permanent magnets shown in the illustrative embodiments may also include one or more sections of magnetically impermeable material, for example to provide structural support, containment, or protection.

The flow of magnetic flux through a permanent magnet assembly according to the invention can be directed in a variety of ways as known to those skilled in the art. Although the permanent magnet sections shown in the illustrative embodiments herein may be magnetically coupled through direct contact, magnetic coupling of two permanent magnets can also be achieved using a section of magnetically permeable material to join the two permanent magnets. Similarly, magnetic coupling of a permanent magnet section and a section formed of magnetically permeable material, such as a pole piece or sheath, can be accomplished through direct contact or indirectly using a section of magnetic material. As used in this disclosure and in the claims, the phrase "magnetically coupled" means to connect, directly or indirectly via magnetically permeable material so that at least a portion of the magnetic flux flows between two points.

Although the illustrative embodiments may show pole pieces, blocking magnets, flux containment jackets, or flux containment sheaths formed as unitary structures, these structures may be comprised of individual sections which are operatively coupled together. For example, individual sections can be placed in direct contact or they can be joined with magnetically permeable material.

Similarly, the relative dimensions, shapes, and positions of the permanent magnet sections, pole pieces, blocking magnets, flux containment jackets, or flux containment sheaths can be optimized for a particular application. For example, these structures can include one or more chamfers or filled-in corners to optimize flux return while minimizing stray flux, assembly weight, and rotational moment of inertia.

Although the exemplary embodiments of the present invention herein may show permanent magnet sections or portions positioned adjacent to an air gap without any intermediate components, this is not required. For example, one or more pole faces formed of magnetically permeable material may be positioned between the permanent magnet sections or portions and the air gap in order to direct or concentrate the magnetic flux through the air gap. Pole faces formed of magnetically permeable material may be especially useful to provide an air gap having precise dimensions, as precise machining of magnetically permeable material is generally preferred to precise machining of permanent magnet material.

Although the surfaces of faces surrounding the air gap at high magnetic field, such as pole faces, are shown herein as essentially planar, this is not required and other shapes may be used. For example, some applications of a permanent magnet assembly according to the invention could include pole faces having concave or convex shapes. Thus, the cross-section of the air gap at high magnetic field can include, but not be limited to, a rectangle (including but not limited to a square), a parallelogram, a trapezoid, a circle, an oval, or nearly any other shape or combination of shapes.

Although particular structures and portions of the embodiments described herein are referred to using the terms "upper," "lower," "vertical," and "horizontal," and the like, it is understood that those terms are used in reference to the exemplary orientations shown in the drawings herein. It is understood that a permanent magnet assembly according to the invention can be used in any orientation, and the use of a particular term such as "vertical" or "horizontal" is used to describe the relationship between particular structures and portions of the embodiments described herein and not to limit those structures or portions of the embodiments to any particular orientation or frame of reference.

The exemplary embodiments herein are described as being adapted to rotate about an axis whereby the permanent magnet assembly provides a gap at high magnetic field that sweeps an annular region, to thereby apply a time-varying magnetic field to the annular region. By rotating the permanent magnet assembly, a time-varying magnetic field can be applied to a structure located within the annular region, such as a ring of beds containing magnetocaloric materials. In this fashion, a rotating permanent magnet assembly according to the invention can be combined with stationary magnetocaloric materials for use in a rotating magnet magnetic refrigerator.

However, it should be understood that a permanent magnet according to the invention can also be used in a stationary configuration, wherein an annular structure, such as a ring of beds containing magnetocaloric materials, is adapted to rotate relative to the permanent magnet assembly. In this fashion, a stationary permanent magnet assembly according to the invention can be combined with rotating magnetocaloric materials for use in a rotating bed magnetic refrigerator.

Of course, a permanent magnet assembly according to the invention can also be used in a configuration in which both the permanent magnet assembly and the magnetocaloric materials rotate, in opposite directions or in the same direction at different angular velocities. Similarly, a permanent magnet assembly according to the invention can be used in a configuration in which either or both of the permanent magnet assembly or the magnetocaloric materials oscillate back and forth or otherwise move relative to each other.

It is understood that the invention is not limited to the particular embodiments described herein, but embraces all such modified forms thereof as come within the scope of the following claims.

What is claimed is:

1. A permanent magnet assembly comprising:
a first upper radial permanent magnet and a second upper radial permanent magnet;
each upper radial permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;
each upper radial permanent magnet having a magnetization vector wherein its inside radial face is a flux exit face, its outside radial face is a flux entry face, and its upper and lower faces are flux parallel faces;
and wherein the inside lateral face of the first upper radial permanent magnet is fastened to the inside lateral face of the second upper radial permanent magnet;
a first lower radial permanent magnet and a second lower radial permanent magnet,
each central lower radial permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;

each lower radial permanent magnet having a magnetization vector wherein its inside radial face is a flux entry face, its outside radial face is a flux exit face, and its upper and lower faces are flux parallel faces;

and wherein the inside lateral face of the first lower radial permanent magnet is fastened to the inside lateral face of the second lower radial permanent magnet;

a first central axial permanent magnet and a second central axial permanent magnet;

each central axial permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;

each central axial permanent magnet having a magnetization vector wherein its inside radial face and outside radial face are flux parallel faces, its upper face is a flux exit face, and its lower face is a flux entry face;

wherein the inside lateral face of the first central axial permanent magnet is fastened to the inside lateral face of the second central axial permanent magnet;

wherein the upper face of the first central axial permanent magnet is magnetically coupled to the lower face of the first upper radial permanent magnet;

wherein the lower face of the first central axial permanent magnet is magnetically coupled to the upper face of the first lower radial permanent magnet;

wherein the upper face of the second central axial permanent magnet is magnetically coupled to the lower face of the second upper radial permanent magnet;

and wherein the lower face of the second central axial permanent magnet is magnetically coupled to the upper face of the second lower radial permanent magnet;

a first upper axial permanent magnet and a second upper axial permanent magnet;

each upper axial permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;

each upper axial permanent magnet having a magnetization vector wherein its inside radial face and outside radial face are flux parallel faces, its upper face is a flux entry face, and its lower face is a flux exit face;

wherein the inside lateral face of the first upper axial permanent magnet is fastened to the inside lateral face of the second upper axial permanent magnet;

wherein the inside radial face of the first upper radial permanent magnet is magnetically coupled to the outside radial face of the first upper axial permanent magnet;

wherein the inside radial face of the second upper radial permanent magnet is magnetically coupled to the outside radial face of the second upper axial permanent magnet;

a first lower axial permanent magnet and a second lower axial permanent magnet;

each lower axial permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;

each lower axial permanent magnet having a magnetization vector wherein its inside radial face and outside radial face are flux parallel faces, its upper face is a flux entry face, and its lower face is a flux exit face;

wherein the inside lateral face of the first lower axial permanent magnet is fastened to the inside lateral face of the second lower axial permanent magnet;

wherein the inside radial face of the first lower radial permanent magnet is magnetically coupled to the outside radial face of the first lower axial permanent magnet;

wherein the inside radial face of the second lower radial permanent magnet is magnetically coupled to the outside radial face of the second lower axial permanent magnet;

whereby a first gap experiencing a high magnetic field is formed between at least a portion of the lower face of the first upper axial permanent magnet and at least a portion of the upper face of the first lower axial permanent magnet, and a second gap experiencing a high magnetic field is formed between at least a portion of the lower face of the second upper axial permanent magnet and at least a portion of the upper face of the second lower axial permanent magnet.

2. The permanent magnet assembly of claim 1, further comprising:

a first upper radial blocking permanent magnet and a second upper radial blocking permanent magnet;

each upper radial blocking permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;

each upper radial blocking permanent magnet having a magnetization vector wherein its inside radial face is a flux entry face, its outside radial face is a flux exit face, and its upper and lower faces are flux parallel faces;

and wherein the inside lateral face of the first upper radial blocking permanent magnet is fastened to the inside lateral face of the second upper radial blocking permanent magnet;

a first lower radial blocking permanent magnet and a second lower radial blocking permanent magnet;

each lower radial blocking permanent magnet formed as a polyhedral solid having six or more essentially planar faces comprising an upper face substantially parallel to and opposite a lower face, an inside lateral face opposite an outside lateral face, and an inside radial face substantially parallel to and opposite an outside radial face, wherein its upper and lower faces are substantially orthogonal to its inside and outside radial faces;

each lower radial blocking permanent magnet having a magnetization vector wherein its inside radial face is a flux exit face, its outside radial face is a flux entry face, and its upper and lower faces are flux parallel faces;

and wherein the inside lateral face of the first lower radial blocking permanent magnet is fastened to the inside lateral face of the second lower radial blocking permanent magnet;

wherein the outside radial face of the first upper radial blocking permanent magnet is magnetically coupled to the inside radial face of the first upper axial permanent magnet;

wherein the outside radial face of the second upper radial blocking permanent magnet is magnetically coupled to the inside radial face of the second upper axial permanent magnet;

wherein the outside radial face of the first lower radial blocking permanent magnet is magnetically coupled to the inside radial face of the first lower axial permanent magnet; and wherein the outside radial face of the second lower radial blocking permanent magnet is magnetically coupled to the inside radial face of the second lower axial permanent magnet.

3. The permanent magnet assembly of claim 2, further comprising:

a first upper circumferential blocking permanent magnet, a second upper circumferential blocking permanent magnet, a first lower circumferential blocking permanent magnet, and a second lower circumferential blocking permanent magnet;

each circumferential blocking permanent magnet formed as a polyhedral solid having six or more essentially planar faces comprising an upper face opposite a lower face, an inside lateral face opposite an outside lateral face, and an inside radial face opposite an outside radial face;

the first upper circumferential blocking permanent magnet having a magnetization vector wherein its outside lateral face is a flux entry face, its inside lateral face is a flux exit face, and its upper and lower faces are flux parallel faces and wherein the inside lateral face of the first upper circumferential blocking permanent magnet is magnetically coupled to the outside lateral face of the first upper radial magnet and magnetically coupled to the outside lateral face of the first upper axial magnet;

the second upper circumferential blocking permanent magnet having a magnetization vector wherein its outside lateral face is a flux entry face, its inside lateral face is a flux exit face, and its upper and lower faces are flux parallel faces and wherein the inside lateral face of the second upper circumferential blocking permanent magnet is magnetically coupled to the outside lateral face of the second upper radial magnet and magnetically coupled to the outside lateral face of the second upper axial magnet;

the first lower circumferential blocking permanent magnet having a magnetization vector wherein its outside lateral face is a flux exit face, its inside lateral face is a flux entry face, and its upper and lower faces are flux parallel faces and wherein the inside lateral face of the first lower circumferential blocking permanent magnet is magnetically coupled to the outside lateral face of the first lower radial magnet and magnetically coupled to the outside lateral face of the first lower axial magnet; and the second lower circumferential blocking permanent magnet having a magnetization vector wherein its outside lateral face is a flux exit face, its inside lateral face is a flux entry face, and its upper and lower faces are flux parallel faces and wherein the inside lateral face of the second lower circumferential blocking permanent magnet is magnetically coupled to the outside lateral face of the second lower radial magnet and magnetically coupled to the outside lateral face of the second lower axial magnet.

4. The permanent magnet assembly of claim 1, further comprising:

a first upper circumferential blocking permanent magnet, a second upper circumferential blocking permanent magnet, a first lower circumferential blocking permanent magnet, and a second lower circumferential blocking permanent magnet;

each circumferential blocking permanent magnet formed as a polyhedral solid having six or more essentially planar faces comprising an upper face opposite a lower face, an inside lateral face opposite an outside lateral face, and an inside radial face opposite an outside radial face;

the first upper circumferential blocking permanent magnet having a magnetization vector wherein its outside lateral face is a flux entry face, its inside lateral face is a flux exit face, and its upper and lower faces are flux parallel faces and wherein the inside lateral face of the first upper circumferential blocking permanent magnet is magnetically coupled to the outside lateral face of the first upper radial magnet and magnetically coupled to the outside lateral face of the first upper axial magnet;

the second upper circumferential blocking permanent magnet having a magnetization vector wherein its outside lateral face is a flux entry face, its inside lateral face is a flux exit face, and its upper and lower faces are flux parallel faces and wherein the inside lateral face of the second upper circumferential blocking permanent magnet is magnetically coupled to the outside lateral face of the second upper radial magnet and magnetically coupled to the outside lateral face of the second upper axial magnet;

the first lower circumferential blocking permanent magnet having a magnetization vector wherein its outside lateral face is a flux exit face, its inside lateral face is a flux entry face, and its upper and lower faces are flux parallel faces and wherein the inside lateral face of the first lower circumferential blocking permanent magnet is magnetically coupled to the outside lateral face of the first lower radial magnet and magnetically coupled to the outside lateral face of the first lower axial magnet; and the second lower circumferential blocking permanent magnet having a magnetization vector wherein its outside lateral face is a flux exit face, its inside lateral face is a flux entry face, and its upper and lower faces are flux parallel faces and wherein the inside lateral face of the second lower circumferential blocking permanent magnet is magnetically coupled to the outside lateral face of the second lower radial magnet and magnetically coupled to the outside lateral face of the second lower axial magnet.

5. The permanent magnet assembly of claim 1, wherein the first upper radial permanent magnet assembly, the second upper radial permanent magnet assembly, the first central axial permanent magnet assembly, the second central axial permanent magnet assembly, the first lower radial permanent magnet assembly, and the second lower radial permanent magnet assembly each have six essentially planar faces.

6. A permanent magnet assembly comprising:

an upper radial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the upper radial permanent magnet having a magnetization vector wherein its inside radial face is a flux exit face, its outside radial face is a flux entry face, and its upper and lower faces are flux parallel faces;

a lower radial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the lower radial permanent magnet having a magnetization vector wherein its inside radial face is a flux entry face, its outside radial face is a flux exit face, and its upper and lower faces are flux parallel faces;

a central axial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the central axial permanent magnet having a magnetization vector wherein its inside radial face and outside radial face are flux parallel faces, its upper face is a flux exit face, and its lower face is a flux entry face;

wherein the upper face of the lower radial permanent magnet is magnetically coupled to the lower face of the central axial permanent magnet;

wherein the lower face of the upper radial permanent magnet is magnetically coupled to the upper face of the central axial permanent magnet;

an upper axial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the upper axial permanent magnet having a magnetization vector wherein its inside radial face and its outside radial face are flux parallel faces, its upper face is a flux entry face and its lower face is a flux exit face;

wherein the inside radial face of the upper radial permanent magnet is magnetically coupled to the outside radial face of the upper axial permanent magnet; and a lower axial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the lower axial permanent magnet having a magnetization vector wherein its inside radial face and its outside radial face are flux parallel faces, its upper face is a flux entry face and its lower face is a flux exit face;

wherein the inside radial face of the lower radial permanent magnet is magnetically coupled to the outside radial face of the lower axial permanent magnet;

whereby an arc-shaped gap experiencing a high magnetic field is formed between at least a portion of the lower face of the upper axial permanent magnet and at least a portion of the upper face of the lower axial permanent magnet.

7. The permanent magnet assembly of claim 6, further comprising:

an exterior sheath formed as an arc-shaped solid of magnetically permeable material having a concave curved inside radial face that is magnetically coupled to at least a portion of the outside radial face of the upper radial permanent magnet, at least a portion of the outside radial face of the central axial permanent magnet, and at least a portion of the outside radial face of the lower radial permanent magnet.

8. The permanent magnet assembly of claim 7, further comprising:

an upper sheath formed as an arc-shaped solid of magnetically permeable material having a substantially planar bottom face that is magnetically coupled to at least a portion of the upper face of the upper radial permanent magnet and at least a portion of the upper face of the upper axial permanent magnet; and a lower sheath formed as an arc-shaped solid of magnetically permeable material having a substantially planar upper face that is magnetically coupled to at least a portion of the lower face of the lower radial permanent magnet and at least a portion of the lower face of the lower axial permanent magnet.

9. The permanent magnet assembly of claim 8, further comprising:

an upper pole piece formed as an arc-shaped solid of magnetically permeable material having a substantially planar upper face that is magnetically coupled to at least a portion of the lower face of the upper axial permanent magnet; and a lower pole piece formed as an arc-shaped solid of magnetically permeable material having a substantially planar lower face that is magnetically coupled to at least a portion of the upper face of the lower axial permanent magnet.

10. The permanent magnet assembly of claim 6, further comprising:

an upper sheath formed as an arc-shaped solid of magnetically permeable material having a substantially planar bottom face that is magnetically coupled to at least a portion of the upper face of the upper radial permanent magnet and at least a portion of the upper face of the upper axial permanent magnet; and a lower sheath formed as an arc-shaped solid of magnetically permeable material having a substantially planar upper face that is magnetically coupled to at least a portion of the lower face of the lower radial permanent magnet and at least a portion of the lower face of the lower axial permanent magnet.

11. A permanent magnet assembly comprising:

a first upper radial permanent magnet and a second upper radial permanent magnet;

each upper radial permanent magnet formed as a rectangular block having six or more essentially planar faces comprising an upper face substantially parallel to and opposite a lower face, a first lateral face opposite a second lateral face, and an inside radial face substantially parallel to and opposite an outside radial face, wherein its upper and lower faces, its inside and outside radial faces, and its first and second lateral faces are substantially orthogonal;

each upper radial permanent magnet having a magnetization vector wherein its inside radial face is a flux entry face, its outside radial face is a flux exit face, its first and second lateral faces are flux parallel faces, and its upper and lower faces are flux parallel faces;

and wherein the inside radial face of the first upper radial permanent magnet is joined to the inside radial face of the second upper radial permanent magnet by a slab of magnetically permeable material;

a first upper axial permanent magnet and a second upper axial permanent magnet;

each upper axial permanent magnet formed as a rectangular block having six or more essentially planar faces comprising an upper face substantially parallel to and opposite a lower face, a first lateral face opposite a second lateral face, and an inside radial face substantially parallel to and opposite an outside radial face, wherein its upper and lower faces, its first and second lateral faces, and its inside and outside radial faces are substantially orthogonal;

each upper axial permanent magnet having a magnetization vector wherein its upper face is a flux entry face, its lower face is a flux exit face, its first and second lateral faces are flux parallel faces, and its inside and outside radial faces are flux parallel faces;

wherein the inside radial face of the first upper axial permanent magnet is magnetically coupled to the outside radial face of the first upper radial permanent magnet;

wherein the inside radial face of the second upper axial permanent magnet is magnetically coupled to the outside radial face of the second upper radial permanent magnet;

a first lower radial permanent magnet and a second lower radial permanent magnet;

each lower radial permanent magnet formed as a rectangular block having six or more essentially planar faces comprising an upper face substantially parallel to and opposite a lower face, a first lateral face opposite a second lateral face, and an inside radial face substantially parallel to and opposite an outside radial face, wherein its upper and lower faces, its inside and outside radial faces, and its first and second lateral faces are substantially orthogonal;

each lower radial permanent magnet having a magnetization vector wherein its inside radial face is a flux exit face, its outside radial face is a flux entry face, its first and second lateral faces are flux parallel faces, and its upper and lower faces are flux parallel faces;

and wherein the inside radial face of the first lower radial permanent magnet is joined to the inside radial face of the second lower radial permanent magnet by a slab of magnetically permeable material;

a first lower axial permanent magnet and a second lower axial permanent magnet;

each lower axial permanent magnet formed as a rectangular block having six or more essentially planar faces comprising an upper face substantially parallel to and opposite a lower face, a first lateral face opposite a second lateral face, and an inside radial face substantially parallel to and opposite an outside radial face, wherein its upper and lower faces, its first and second lateral faces, and its inside and outside radial faces are substantially orthogonal;

each lower axial permanent magnet having a magnetization vector wherein its upper face is a flux entry face, its lower face is a flux exit face, its first and second lateral faces are flux parallel faces, and its inside and outside radial faces are flux parallel faces;

wherein the inside radial face of the first lower axial permanent magnet is magnetically coupled to the outside radial face of the first lower radial permanent magnet;

wherein the inside radial face of the second lower axial permanent magnet is magnetically coupled to the outside radial face of the second lower radial permanent magnet;

a central axial permanent magnet formed as a solid having an upper face opposite a lower face;

the central axial permanent magnet having a magnetization vector wherein its upper face is a flux exit face and its lower face is a flux entry face;

wherein at least a portion of the upper face of the central axial permanent magnet is magnetically coupled to at least a portion of the lower face of the first upper radial permanent magnet and at least a portion of the lower face of the second upper radial permanent magnet;

wherein at least a portion of the lower face of the central axial permanent magnet is magnetically coupled to at least a portion of the upper face of the first lower radial permanent magnet and at least a portion of the upper face of the second lower radial permanent magnet;

whereby a first gap experiencing a high magnetic field is formed between at least a portion of the lower face of the first upper axial permanent magnet and at least a portion of the upper face of the first lower axial permanent magnet, and a second gap experiencing a high magnetic field is formed between at least a portion of the lower face of the second upper axial permanent magnet and at least a portion of the upper face of the second lower axial permanent magnet.

12. The permanent magnet assembly of claim 11, further comprising:

a first upper radial blocking permanent magnet, a second upper radial blocking permanent magnet, a first lower radial blocking permanent magnet, and a second lower radial blocking permanent magnet;

each radial blocking permanent magnet formed as a rectangular block having six or more essentially planar faces comprising an upper face substantially parallel to and opposite a lower face, a first lateral face substantially parallel to and opposite a second lateral face, and an inside radial face substantially parallel to and opposite an outside radial face, wherein its upper and lower faces, its first and second lateral faces, and its inside and outside radial faces are substantially orthogonal;

each upper radial blocking permanent magnet having a magnetization vector wherein its inside radial face is a flux exit face, its outside radial face is a flux entry face, its first and second lateral faces are flux parallel faces, and its upper and lower faces are flux parallel faces;

each lower radial blocking permanent magnet having a magnetization vector wherein its inside radial face is a flux entry face, its outside radial face is a flux exit face, its first and second lateral faces are flux parallel faces, and its upper and lower faces are flux parallel faces;

wherein the inside radial face of the first upper radial blocking permanent magnet is magnetically coupled to the outside radial face of the first upper axial permanent magnet;

wherein the inside radial face of the second upper radial blocking permanent magnet is magnetically coupled to the outside radial face of the second upper axial permanent magnet;

wherein the inside radial face of the first lower radial blocking permanent magnet is magnetically coupled to the outside radial face of the first lower axial permanent magnet; and wherein the inside radial face of the second lower radial blocking permanent magnet is magnetically coupled to the outside radial face of the second lower axial permanent magnet.

13. The permanent magnet assembly of claim 11, further comprising:

a first upper lateral blocking permanent magnet, a second upper lateral blocking permanent magnet, a first lower lateral blocking permanent magnet, and a second lower lateral blocking permanent magnet;

each lateral blocking permanent magnet formed as a rectangular block having six or more essentially planar faces comprising an upper face substantially parallel to and opposite a lower face, a first lateral face substantially parallel to and opposite a second lateral face, and an inside radial face substantially parallel to and opposite an outside radial face, wherein its upper and lower faces, its first and second lateral faces, and its inside and outside radial faces are substantially orthogonal;

each upper lateral blocking permanent magnet having a magnetization vector wherein its inside radial face is a flux exit face, its outside radial face is a flux entry face, its first and second lateral faces are flux parallel faces, and its upper and lower faces are flux parallel faces;

each lower lateral blocking permanent magnet having a magnetization vector wherein its inside radial face is a flux entry face, its outside radial face is a flux exit face, its first and second lateral faces are flux parallel faces, and its upper and lower faces are flux parallel faces;

wherein the inside radial face of the first upper lateral blocking permanent magnet is magnetically coupled to at least a portion of the first lateral face of the first upper radial permanent magnet and at least a portion of the first lateral face of the second upper radial permanent magnet;

wherein the inside radial face of the second upper lateral blocking permanent magnet is magnetically coupled to at least a portion of the second lateral face of the first upper radial permanent magnet and at least a portion of the second lateral face of the second upper radial permanent magnet;

wherein the inside radial face of the first lower lateral blocking permanent magnet is magnetically coupled to at least a portion of the first lateral face of the first lower radial permanent magnet and at least a portion of the first lateral face of the second lower radial permanent magnet; and wherein the inside radial face of the second lower lateral blocking permanent magnet is magnetically coupled to at least a portion of the second lateral face of the first lower radial permanent magnet and at least a portion of the second lateral face of the second lower radial permanent magnet.

14. The permanent magnet assembly of claim 11, further comprising:

an upper sheath formed as a solid of magnetically permeable material having a substantially planar bottom face that is magnetically coupled to at least a portion of the upper face of the first upper axial permanent magnet, at least a portion of the upper face of the first upper radial permanent magnet, at least a portion of the upper face of the second upper radial permanent magnet, and at least a portion of the upper face of the second upper axial permanent magnet; and a lower sheath formed as a solid of magnetically permeable material having a substantially planar upper face that is magnetically coupled to at least a portion of the lower face of the first lower axial permanent magnet, at least a portion of the lower face of the first lower radial permanent magnet, at least a portion of the lower face of the second lower radial permanent magnet, and at least a portion of the lower face of the second lower axial permanent magnet.

15. The permanent magnet assembly of claim 11, further comprising:

a first upper pole piece formed as a solid of magnetically permeable material having a substantially planar upper face that is magnetically coupled to at least a portion of the lower face of the first upper axial permanent magnet;

a second upper pole piece formed as a solid of magnetically permeable material having a substantially planar upper face that is magnetically coupled to at least a portion of the lower face of the second upper axial permanent magnet;

a first lower pole piece formed as a solid of magnetically permeable material having a substantially planar lower face that is magnetically coupled to at least a portion of the upper face of the first lower axial permanent magnet; and a second lower pole piece formed as a solid of magnetically permeable material having a substantially planar lower face that is magnetically coupled to at least a portion of the upper face of the second lower axial permanent magnet.

16. A permanent magnet assembly comprising:

an exterior axial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the exterior axial permanent magnet having a magnetization vector wherein its upper face is a flux exit face, its lower face is a flux entry face, its inside and outside radial faces are flux parallel faces, and its first and second circumferential end faces are flux parallel faces;

an interior axial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the interior axial permanent magnet having a magnetization vector wherein its upper face is a flux entry face, its lower face is a flux exit face, its inside and outside radial faces are flux parallel faces, and its first and second circumferential end faces are flux parallel faces;

a central radial permanent magnet formed as an arc-shaped solid having six or more faces comprising an upper face opposite a substantially planar lower face, a concave curved inside radial face opposite a convex curved outside radial face, and first and second circumferential end faces;

the central radial permanent magnet having a magnetization vector wherein its inside radial face is a flux entry face, its outside radial face is a flux exit face, its upper and lower faces are flux parallel faces, and its first and second circumferential end faces are flux parallel faces;

wherein the inside radial face of the exterior axial permanent magnet is magnetically coupled to the outside radial face of the central radial permanent magnet;

wherein the outside radial face of the interior axial permanent magnet is magnetically coupled to the inside radial face of the central radial permanent magnet;

an exterior radial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the exterior radial permanent magnet having a magnetization vector wherein its upper and lower faces are flux parallel faces, its inside radial face is a flux exit face, its outside radial face is a flux entry face, and its first and second circumferential end faces are flux parallel faces;

wherein at least a portion of the lower face of the exterior radial permanent magnet is magnetically coupled to the upper face of the exterior axial permanent magnet;

an interior radial permanent magnet formed as an arc-shaped solid having six or more faces comprising a substantially planar upper face substantially parallel to and opposite a substantially planar lower face, a concave curved inside radial face opposite a convex curved outside radial face, and first and second circumferential end faces;

the interior radial permanent magnet having a magnetization vector wherein its upper and lower faces are flux parallel faces, its inside radial face is a flux exit face, its outside radial face is a flux entry face, and its first and second circumferential end faces are flux parallel faces;

wherein at least a portion of the lower face of the interior radial permanent magnet is magnetically coupled to the upper face of the interior axial permanent magnet;

whereby an arc-shaped gap experiencing a high magnetic field is formed between at least a portion of the inner radial face of the exterior radial permanent magnet and at least a portion of the outer radial face of the interior radial permanent magnet.

17. The permanent magnet assembly of claim 16, wherein the central radial permanent magnet has an interior chamfer between its inside radial face and its upper face, and an exterior chamfer between its outside radial face and its upper face.

18. The permanent magnet assembly of claim 16, further comprising:
an exterior sheath formed as a solid of magnetically permeable material having a concave inside radial face that is magnetically coupled to at least a portion of the outside radial face of the exterior radial permanent magnet and at least a portion of the outside radial face of the exterior axial permanent magnet;
a bottom sheath formed as a solid of magnetically permeable material having a substantially planar upper face that is magnetically coupled to at least a portion of the lower face of the interior axial permanent magnet, at least a portion of the lower face of the central radial permanent magnet, and at least a portion of the lower face of the exterior axial permanent magnet; and
an interior sheath formed as a solid of magnetically permeable material having a convex outside radial face that is magnetically coupled to at least a portion of the inside radial face of the interior radial permanent magnet and at least a portion of the inside radial face of the interior axial permanent magnet.

19. The permanent magnet assembly of claim 16, further comprising:
an interior pole piece formed as an arc-shaped solid of magnetically permeable material having a concave inside radial face that is magnetically coupled to at least a portion of the outside radial face of the interior radial permanent magnet; and
an exterior pole piece formed as an arc-shaped solid of magnetically permeable material having a convex outside radial face that is magnetically coupled to at least a portion of the inside radial face of the exterior radial permanent magnet.

20. The permanent magnet assembly of claim 19, wherein the central radial permanent magnet has an interior chamfer between its inside radial face and its upper face wherein the interior pole piece is magnetically coupled to the interior chamfer, and an exterior chamfer between its outside radial face and its upper face wherein the exterior pole piece is magnetically coupled to the exterior chamfer.

21. A permanent magnet assembly comprising:
a first upper major radial permanent magnet and a second upper major radial permanent magnet;
each upper major radial permanent magnet formed as a polyhedral solid having seven or more essentially planar faces comprising a five-sided upper face substantially parallel to and opposite a five-sided lower face, a first lateral face substantially parallel to and opposite a second lateral face, a first outside radial face and a second outside radial face opposite an inside radial face, wherein its upper and lower faces, its inside radial face, and its first and second lateral faces are substantially orthogonal;
each upper major radial permanent magnet having a magnetization vector wherein its inside radial face is at least a partial flux entry face, its outside radial faces are at least partial flux exit faces, its first and second lateral faces are flux parallel faces, and its upper and lower faces are flux parallel faces;
and wherein the inside radial face of the first upper major radial permanent magnet is joined to the inside radial face of the second upper major radial permanent magnet by a slab of magnetically permeable material;
a first upper axial permanent magnet and a second upper axial permanent magnet;
each upper axial permanent magnet formed as a polyhedral solid having eight or more essentially planar faces comprising an upper face substantially parallel to and opposite a lower face, a first inside radial face and a second inside radial face, a first lateral face opposite a second lateral face, and a first outside radial face and a second outside radial face,
each upper axial permanent magnet having a magnetization vector wherein its inside radial faces, its lateral faces, and its outside radial face are flux parallel faces, wherein the upper face is a flux entry face, and the lower face is a flux exit face;
wherein the first outside radial face of the first upper major radial permanent magnet is magnetically coupled to the first inside radial face of the first upper axial permanent magnet and the second outside radial face of the first upper major radial permanent magnet is magnetically coupled to the second inside radial face of the first upper axial permanent magnet;
wherein the first outside radial face of the second upper major radial permanent magnet is magnetically coupled to the first inside radial face of the second upper axial permanent magnet and the second outside radial face of the second upper major radial permanent magnet is magnetically coupled to the second inside radial face of the second upper axial permanent magnet;

a first lower major radial permanent magnet and a second lower major radial permanent magnet;

each lower major radial permanent magnet formed as a polyhedral solid having seven or more essentially planar faces comprising a five-sided upper face substantially parallel to and opposite a five-sided lower face, a first lateral face substantially parallel to and opposite a second lateral face, a first outside radial face and a second outside radial face opposite an inside radial face, wherein its upper and lower faces, its inside radial face, and its first and second lateral faces are substantially orthogonal;

each lower major radial permanent magnet having a magnetization vector wherein its inside radial face is at least a partial flux exit face, its outside radial faces are at least partial flux entry faces, its first and second lateral faces are flux parallel faces, and its upper and lower faces are flux parallel faces;

and wherein the inside radial face of the first lower major radial permanent magnet is joined to the inside radial face of the second lower major radial permanent magnet by a slab of magnetically permeable material;

a first lower axial permanent magnet and a second lower axial permanent magnet;

each lower axial permanent magnet formed as a polyhedral solid having eight or more essentially planar faces comprising an upper face substantially parallel to and opposite a lower face, a first inside radial face and a second inside radial face, a first lateral face opposite a second lateral face, and a first outside radial face and a second outside radial face, each upper axial permanent magnet having a magnetization vector wherein its inside radial faces, its lateral faces, and its outside radial face are flux parallel faces, wherein the upper face is a flux entry face, and the lower face is a flux exit face;

wherein the first outside radial face of the first lower major radial permanent magnet is magnetically coupled to the first inside radial face of the first lower axial permanent magnet and the second outside radial face of the first lower major radial permanent magnet is magnetically coupled to the second inside radial face of the first lower axial permanent magnet;

wherein the first outside radial face of the second lower major radial permanent magnet is magnetically coupled to the first inside radial face of the second lower axial permanent magnet and the second outside radial face of the second lower major radial permanent magnet is magnetically coupled to the second inside radial face of the second lower axial permanent magnet;

a central axial permanent magnet formed as a solid having an upper face opposite a lower face;

the central axial permanent magnet having a magnetization vector wherein its upper face is a flux exit face and its lower face is a flux entry face;

wherein at least a portion of the upper face of the central axial permanent magnet is magnetically coupled to at least a portion of the lower face of the first upper major radial permanent magnet and at least a portion of the lower face of the second upper major radial permanent magnet;

wherein at least a portion of the lower face of the central axial permanent magnet is magnetically coupled to at least a portion of the upper face of the first lower major radial permanent magnet and at least a portion of the upper face of the second lower major radial permanent magnet;

whereby a first gap experiencing a high magnetic field is formed between at least a portion of the lower face of the first upper axial permanent magnet and at least a portion of the upper face of the first lower axial permanent magnet, and a second gap experiencing a high magnetic field is formed between at least a portion of the lower face of the second upper axial permanent magnet and at least a portion of the upper face of the second lower axial permanent magnet.

22. The permanent magnet assembly of claim 21, further comprising:

a first, a second, a third, and a fourth upper radial blocking permanent magnet, and a first, a second, a third, and a fourth lower radial blocking permanent magnet;

each radial blocking permanent magnet formed as a rectangular block having six or more essentially planar faces comprising an upper face substantially parallel to and opposite a lower face, a first lateral face substantially parallel to and opposite a second lateral face, and an inside radial face substantially parallel to and opposite an outside radial face, wherein its upper and lower faces, its first and second lateral faces, and its inside and outside radial faces are substantially orthogonal;

each upper radial blocking permanent magnet having a magnetization vector wherein its inside radial face is a flux exit face, its outside radial face is a flux entry face, its first and second lateral faces are flux parallel faces, and its upper and lower faces are flux parallel faces;

each lower radial blocking permanent magnet having a magnetization vector wherein its inside radial face is a flux entry face, its outside radial face is a flux exit face, its first and second lateral faces are flux parallel faces, and its upper and lower faces are flux parallel faces;

wherein the first outside radial face of the first upper axial permanent magnet is magnetically coupled to the inside radial face of the first upper radial blocking permanent magnet;

wherein the second outside radial face of the first upper axial permanent magnet is magnetically coupled to the inside radial face of the second upper radial blocking permanent magnet;

wherein the first outside radial face of the second upper axial permanent magnet is magnetically coupled to the inside radial face of the third upper radial blocking permanent magnet;

wherein the second outside radial face of the second upper axial permanent magnet is magnetically coupled to the inside radial face of the fourth upper radial blocking permanent magnet;

wherein the first outside radial face of the first lower axial permanent magnet is magnetically coupled to the inside radial face of the first lower radial blocking permanent magnet;

wherein the second outside radial face of the first lower axial permanent magnet is magnetically coupled to the inside radial face of the second lower radial blocking permanent magnet;

wherein the first outside radial face of the second lower axial permanent magnet is magnetically coupled to the inside radial face of the third lower radial blocking permanent magnet; and wherein the second outside radial face of the second lower axial permanent magnet is magnetically coupled to the inside radial face of the fourth lower radial blocking permanent magnet.

23. The permanent magnet assembly of claim 22, further comprising:
a first, a second, a third, and a fourth upper lateral blocking permanent magnet, and a first, a second, a third, and a fourth lower lateral blocking permanent magnet;
each lateral blocking permanent magnet formed as a rectangular block having six or more essentially planar faces comprising an upper face substantially parallel to and opposite a lower face, an inside lateral face substantially parallel to and opposite an outside lateral face, and an inside radial face substantially parallel to and opposite an outside radial face, wherein its upper and lower faces, its first and second lateral faces, and its inside and outside radial faces are substantially orthogonal;
each upper lateral blocking permanent magnet having a magnetization vector wherein its inside lateral face is a flux exit face, its outside lateral face is a flux entry face, its inside and outside radial faces are flux parallel faces, and its upper and lower faces are flux parallel faces;
each lower lateral blocking permanent magnet having a magnetization vector wherein its inside lateral face is a flux entry face, its outside lateral face is a flux exit face, its inside and outside radial faces are flux parallel faces, and its upper and lower faces are flux parallel faces;
wherein the first lateral face of the first upper axial permanent magnet is magnetically coupled to the inside lateral face of the first upper lateral blocking permanent magnet;
wherein the second lateral face of the first upper axial permanent magnet is magnetically coupled to the inside lateral face of the second upper lateral blocking permanent magnet;
wherein the first lateral face of the second upper axial permanent magnet is magnetically coupled to the inside lateral face of the third upper lateral blocking permanent magnet;
wherein the second lateral face of the second upper axial permanent magnet is magnetically coupled to the inside lateral face of the fourth upper lateral blocking permanent magnet;
wherein the first lateral face of the first lower axial permanent magnet is magnetically coupled to the inside lateral face of the first lower lateral blocking permanent magnet;
wherein the second lateral face of the first lower axial permanent magnet is magnetically coupled to the inside lateral face of the second lower lateral blocking permanent magnet;
wherein the first lateral face of the second lower axial permanent magnet is magnetically coupled to the inside lateral face of the third lower lateral blocking permanent magnet; and
wherein the second lateral face of the second lower axial permanent magnet is magnetically coupled to the inside lateral face of the fourth lower lateral blocking permanent magnet.

24. The permanent magnet assembly of claim 23, further comprising:
a first, a second, a third, and a fourth upper minor radial permanent magnet, and a first, a second, a third, and a fourth lower minor radial permanent magnet;
each minor radial permanent magnet formed as a rectangular block having six or more essentially planar faces comprising an upper face substantially parallel to and opposite a lower face, a first lateral face substantially parallel to and opposite a second lateral face, and an inside radial face substantially parallel to and opposite an outside radial face, wherein its upper and lower faces, its first and second lateral faces, and its inside and outside radial faces are substantially orthogonal;
each upper minor radial permanent magnet having a magnetization vector wherein its inside radial face is a flux entry face, its outside radial face is a flux exit face, its first and second lateral faces are flux parallel faces, and its upper and lower faces are flux parallel faces;
each lower minor radial permanent magnet having a magnetization vector wherein its inside radial face is a flux exit face, its outside radial face is a flux entry face, its first and second lateral faces are flux parallel faces, and its upper and lower faces are flux parallel faces;
wherein the first outside radial face of the first upper major radial permanent magnet is magnetically coupled to the inside radial face of the first upper minor radial permanent magnet and the outside radial face of the first upper minor radial permanent magnet is magnetically coupled to the first inside radial face of the first upper axial permanent magnet;
wherein the second outside radial face of the first upper major radial permanent magnet is magnetically coupled to the inside radial face of the second upper minor radial permanent magnet and the outside radial face of the second upper minor radial permanent magnet is magnetically coupled to the second inside radial face of the first upper axial permanent magnet;
wherein the first outside radial face of the second upper major radial permanent magnet is magnetically coupled to the inside radial face of the third upper minor radial permanent magnet and the outside radial face of the third upper minor radial permanent magnet is magnetically coupled to the first inside radial face of the second upper axial permanent magnet;
wherein the second outside radial face of the second upper major radial permanent magnet is magnetically coupled to the inside radial face of the fourth upper minor radial permanent magnet and the outside radial face of the fourth upper minor radial permanent magnet is magnetically coupled to the second inside radial face of the second upper axial permanent magnet;
wherein the first outside radial face of the first lower major radial permanent magnet is magnetically coupled to the inside radial face of the first lower minor radial permanent magnet and the outside radial face of the first lower minor radial permanent magnet is magnetically coupled to the first inside radial face of the first lower axial permanent magnet;
wherein the second outside radial face of the first lower major radial permanent magnet is magnetically coupled to the inside radial face of the second lower minor radial permanent magnet and the outside radial face of the second lower minor radial permanent magnet is magnetically coupled to the second inside radial face of the first lower axial permanent magnet;
wherein the first outside radial face of the second lower major radial permanent magnet is magnetically coupled to the inside radial face of the third lower minor radial permanent magnet and the outside radial face of the third lower minor radial permanent magnet is magnetically coupled to the first inside radial face of the second lower axial permanent magnet; and wherein the second outside radial face of the second lower major radial permanent magnet is magnetically coupled to the inside radial face of the fourth lower minor radial permanent magnet and the outside radial face of the fourth lower minor radial permanent magnet is magnetically coupled to the second inside radial face of the second lower axial permanent magnet;

whereby the first upper major radial permanent magnet is indirectly magnetically coupled to the first upper axial permanent magnet, the second upper major radial permanent magnet is indirectly magnetically coupled to the second upper axial permanent magnet, the first lower major radial permanent magnet is indirectly magnetically coupled to the first lower axial permanent magnet, and the second lower major radial permanent magnet is indirectly magnetically coupled to the second lower axial permanent magnet.

25. The permanent magnet assembly of claim 21, further comprising:
a first, a second, a third, and a fourth upper lateral blocking permanent magnet, and a first, a second, a third, and a fourth lower lateral blocking permanent magnet;

each lateral blocking permanent magnet formed as a rectangular block having six or more essentially planar faces comprising an upper face substantially parallel to and opposite a lower face, an inside lateral face substantially parallel to and opposite an outside lateral face, and an inside radial face substantially parallel to and opposite an outside radial face, wherein its upper and lower faces, its first and second lateral faces, and its inside and outside radial faces are substantially orthogonal;

each upper lateral blocking permanent magnet having a magnetization vector wherein its inside lateral face is a flux exit face, its outside lateral face is a flux entry face, its inside and outside radial faces are flux parallel faces, and its upper and lower faces are flux parallel faces;

each lower lateral blocking permanent magnet having a magnetization vector wherein its inside lateral face is a flux entry face, its outside lateral face is a flux exit face, its inside and outside radial faces are flux parallel faces, and its upper and lower faces are flux parallel faces;

wherein the first lateral face of the first upper axial permanent magnet is magnetically coupled to the inside lateral face of the first upper lateral blocking permanent magnet;

wherein the second lateral face of the first upper axial permanent magnet is magnetically coupled to the inside lateral face of the second upper lateral blocking permanent magnet;

wherein the first lateral face of the second upper axial permanent magnet is magnetically coupled to the inside lateral face of the third upper lateral blocking permanent magnet;

wherein the second lateral face of the second upper axial permanent magnet is magnetically coupled to the inside lateral face of the fourth upper lateral blocking permanent magnet;

wherein the first lateral face of the first lower axial permanent magnet is magnetically coupled to the inside lateral face of the first lower lateral blocking permanent magnet;

wherein the second lateral face of the first lower axial permanent magnet is magnetically coupled to the inside lateral face of the second lower lateral blocking permanent magnet;

wherein the first lateral face of the second lower axial permanent magnet is magnetically coupled to the inside lateral face of the third lower lateral blocking permanent magnet; and wherein the second lateral face of the second lower axial permanent magnet is magnetically coupled to the inside lateral face of the fourth lower lateral blocking permanent magnet.

* * * * *

UNITED STATES PATENT AND TRADEMARK OFFICE
CERTIFICATE OF CORRECTION

PATENT NO.        : 7,148,777 B2                                    Page 1 of 1
APPLICATION NO.   : 11/050109
DATED             : December 12, 2006
INVENTOR(S)       : Jeremy Chell and Carl B. Zimm It is certified that error appears in the above-identified patent and that said Letters Patent is hereby corrected as shown below:

Claim 1, Column 28, Line 60 – the word "central" should be deleted as it did not appear in the Application as filed (p. 50).

Signed and Sealed this

Sixth Day of March, 2007

JON W. DUDAS
*Director of the United States Patent and Trademark Office*